US012363020B2

United States Patent
Barrett et al.

(10) Patent No.: US 12,363,020 B2
(45) Date of Patent: Jul. 15, 2025

(54) GENERATING SYNTHETIC TRANSACTIONS WITH PACKETS

(71) Applicant: NetScout Systems, Inc., Westford, MA (US)

(72) Inventors: Paul Barrett, Westford, MA (US); Bruce Kosbab, Colorado Springs, CO (US); Anil Singhal, Carlisle, MA (US); Robert Vogt, Colorado Springs, CO (US)

(73) Assignee: NetScout Systems, Inc., Westford, MA (US)

( * ) Notice: Subject to any disclaimer, the term of this patent is extended or adjusted under 35 U.S.C. 154(b) by 455 days.

(21) Appl. No.: 17/715,704

(22) Filed: Apr. 7, 2022

(65) Prior Publication Data

US 2022/0329510 A1  Oct. 13, 2022

Related U.S. Application Data

(60) Provisional application No. 63/173,007, filed on Apr. 9, 2021.

(51) Int. Cl.
*H04L 43/55* (2022.01)
(52) U.S. Cl.
CPC ................... *H04L 43/55* (2022.05)
(58) Field of Classification Search
CPC ..... H04L 43/55; H04L 9/0861; H04L 9/0891; H04L 43/106
See application file for complete search history.

(56) References Cited

U.S. PATENT DOCUMENTS

| | | | |
|---|---|---|---|
| 10,033,069 B2* | 7/2018 | Ramani | H01M 4/048 |
| 2001/0050903 A1* | 12/2001 | Vanlint | H04L 41/22 |
| | | | 370/252 |
| 2003/0046388 A1* | 3/2003 | Milliken | H04L 41/046 |
| | | | 709/224 |
| 2004/0054680 A1 | 3/2004 | Kelley et al. | |
| 2007/0150568 A1 | 6/2007 | Ruiz | |
| 2007/0266045 A1* | 11/2007 | Bansal | H04L 67/125 |
| 2007/0266148 A1 | 11/2007 | Ruiz et al. | |
| 2009/0156314 A1 | 6/2009 | Kim | |
| 2009/0240765 A1 | 9/2009 | Wiles, Jr. | |

(Continued)

FOREIGN PATENT DOCUMENTS

WO  WO-2021/190771 A1  9/2021

OTHER PUBLICATIONS

Ghobadi et al. "Caliper: Precise and responsive traffic generator." 2012 IEEE 20th Annual Symposium on High-Performance Interconnects.

(Continued)

*Primary Examiner* — Steven Hieu D Nguyen
(74) *Attorney, Agent, or Firm* — Foley & Lardner LLP

(57) ABSTRACT

Generating synthetic transactions with packets is provided. A synthetic transaction generator can store, in a packet capture trace file, packets corresponding to a test of a service provided through a network. The synthetic transaction generator can transmit the packet capture trace file to a data processing system to cause the data processing system to play or analyze the packet capture trace file to evaluate the performance of the service provided by the service provider.

16 Claims, 7 Drawing Sheets

(56) References Cited

U.S. PATENT DOCUMENTS

| | | | | |
|---|---|---|---|---|
| 2012/0084605 | A1* | 4/2012 | Shilon | H04L 43/50 |
| | | | | 714/33 |
| 2013/0343390 | A1* | 12/2013 | Moriarty | H04L 43/0852 |
| | | | | 370/392 |
| 2014/0149572 | A1 | 5/2014 | Menezes et al. | |
| 2014/0160941 | A1* | 6/2014 | Hui | H04W 24/08 |
| | | | | 370/241 |
| 2014/0297844 | A1* | 10/2014 | Kancherla | H04L 43/0894 |
| | | | | 709/224 |
| 2014/0310392 | A1 | 10/2014 | Ho | |
| 2016/0301732 | A1* | 10/2016 | Moretto | H04L 43/50 |
| 2017/0180235 | A1* | 6/2017 | Zak | H04L 45/26 |
| 2017/0214702 | A1* | 7/2017 | Moscovici | H04W 12/106 |
| 2018/0006816 | A1* | 1/2018 | Taub | H04L 63/06 |
| 2019/0097893 | A1 | 3/2019 | Angoulvant et al. | |

OTHER PUBLICATIONS

Taylor et al. "Classbench: A packet classification benchmark." IEEE Acm transactions on networking Jun. 18, 2007 (pp. 499-511).
Australian Examination Report on AU 2022253898 Dtd Sep. 10, 2024.
Foreign Search Report on EP Dtd Nov. 21, 2024.
Foreign Action other than Search Report on AU DTD Nov. 21, 2023.
Foreign Action other than Search Report on PCT DTD Oct. 19, 2023.

\* cited by examiner

GENERATING SYNTHETIC TRANSACTIONS WITH PACKETS

CROSS-REFERENCES TO RELATED APPLICATIONS

This application claims the benefit of priority under 35 U.S.C. § 119 to U.S. Provisional Patent Application No. 63/173,007, filed Apr. 9, 2021, which is hereby incorporated by reference herein in its entirety.

BACKGROUND

Digital services can be provided by servers to client devices over a network, such as the Internet. For example, servers can provide access to web sites, applications, content, or other digital services. Providers or users of the digital services can periodically test the digital services and content to evaluate the performance of the digital services, or identify issues associated with providing the digital services. However, due to the various security protocols or various networks used by client devices to access digital services, it can be challenging to analyze data packets to evaluate the test of the digital service.

SUMMARY

Systems and methods of this technical solution are directed to generating synthetic transactions with packets. Client devices can access, via a network, a digital service (e.g., cloud service or application) hosted or provided by a service provider. The application can be a software-as-a-service ("SaaS") that executes on a server remote from the client device. To evaluate a performance of the service, a synthetic transaction generator can conduct a synthetic transaction with packets. The synthetic transaction generator can initiate a synthetic transaction to test the performance of the digital service. However, since the client device executing the synthetic transaction generator can be located at a user's home location, it may not be possible to deploy a deep-packet inspection engine or appliance to analyze the packets of the synthetic transaction in order to evaluate a performance associated with the digital service. Thus, systems and methods of this technical solution can provide a synthetic transaction generator in a container or virtual machine that can generate a packet capture trace file that stores the packets corresponding to the synthetic transaction test. The synthetic transaction generator can transmit the packet capture trace file, along with other information, to a data processing system for further processing. The data processing system, upon receiving the packet capture trace file and additional information, can modify one or more parameters or values of the packets and play the packets in real-time (e.g., maintaining relative time intervals between the packets) in order to evaluate the performance of the service using deep-packet inspection.

At least one aspect is directed to a method of generating synthetic transactions to manage the performance of services. The method can be performed by one or more processors. For example, the method can be performed by one or more processors of a client device or one or more processors of a cloud computing system via a virtual machine. The method can include the one or more processors executing a synthetic transaction generator. The method can include the synthetic transaction generator initiating a packet capture for a test of a service provided over a network. The method can include the synthetic transaction generator identifying a plurality of packets corresponding to the test of the service. The method can include the synthetic transaction generator storing, responsive to initiation of the packet capture, the plurality of packets in a packet capture trace file with time stamps corresponding to receipt of each of the plurality of packets. The method can include the synthetic transaction generator terminating the packet capture responsive to completion of the test of the service. The method can include the synthetic transaction generator transmitting, responsive to termination of the packet capture, the packet capture trace file to a data processing system to cause the data processing system to use the packet capture trace file to determine a performance of the service.

At least one aspect is directed to a system to generating synthetic transactions to manage performance of services. The system can include a synthetic transaction generator executed by one or more process. The synthetic transaction generator can initiate a packet capture for a test of a service provided over a network. The synthetic transaction generator can receive a plurality of packets corresponding to the test of the service. The synthetic transaction generator can store, responsive to initiation of the packet capture, the plurality of packets in a packet capture trace file with time stamps corresponding to receipt of each of the plurality of packets. The synthetic transaction generator can terminate the packet capture responsive to completion of the test of the service. The synthetic transaction generator can transmit, responsive to termination of the packet capture, the packet capture trace file to a data processing system to cause the data processing system to use the packet capture trace file to determine a performance of the service.

At least one aspect of this technical solution is directed to a method of generating synthetic transaction to manage performance of services. The method can be performed by a data processing system comprising one or more processors and memory. The method can include the data processing system receiving, via a network, a packet capture trace file. The packet capture trace file can be generated by a synthetic transaction generator configured to execute on one or more processors. The packet capture trace file can store a plurality of packets corresponding to a test of a service provided by a service provider initiated by the synthetic transaction generator on the client device. The packet capture trace file can include a timestamp for every packet. The method can include the data processing system modifying at least one parameter of the packet capture trace file to generate a modified packet capture trace file. The method can include the data processing system playing or analyzing the modified packet capture trace file to transmit packets of the modified packet capture trace file to evaluate a performance of the service provided by the service provider.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1A:
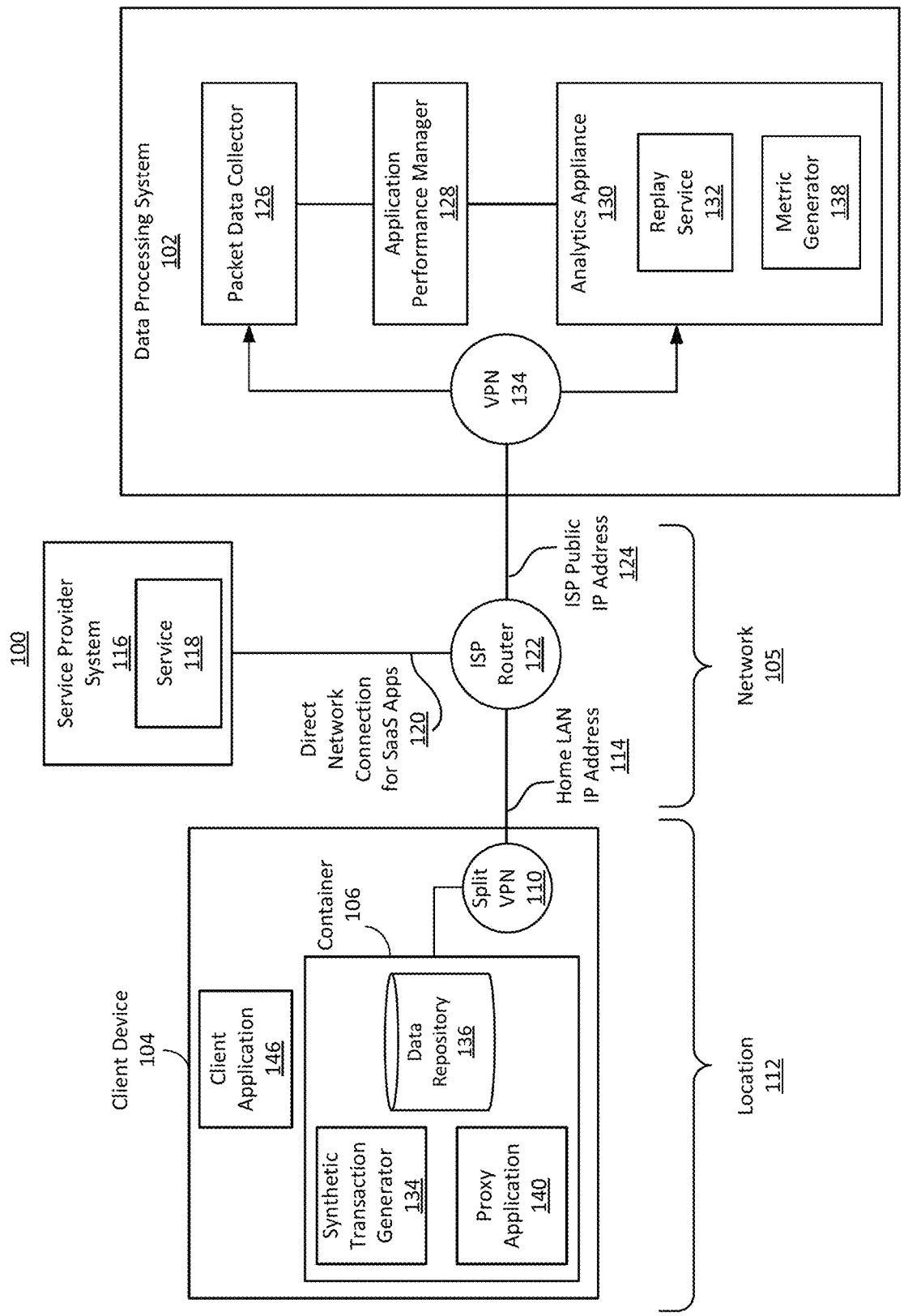
FIG. 1A is an illustration of a system to generate synthetic transactions, in accordance with an implementation.

Following below are more detailed descriptions of various concepts related to, and implementations of, methods, apparatus, and systems of generating synthetic transactions. For example, the methods, apparatus, and systems can provide a synthetic transaction generator that executes on a client device to generate a packet capture trace file comprising packets associated with a synthetic transaction of a service provided by a service provider. The technical solution can provide the packet capture file, a log file, location information, and IP address information to a data processing system to replay the stored packets in real-time in order to evaluate the performance of the service. In some cases, the data processing system can use the timestamps in the packet capture file to analyze the packets without having to replay the trace in real-time. The various concepts introduced above and discussed in greater detail below may be implemented in any of numerous ways.

Organizations can provide digital services, such as a website or application, over a network. To test the availability or performance of the digital service, the organization can execute synthetic transactions. A synthetic transaction can refer to simulating activities performed by an application or client device accessing the digital service. The synthetic transaction can be performed at any time and can facilitate evaluating the availability and performance of a digital service at times when human users may be less active or not active. For example, if a business service becomes unavailable over the weekend, users of that service may not find out until Monday morning. However, by using synthetic transactions to test the availability and performance of a service at regular intervals (e.g., every hour) the operator can be alerted to any problems shortly after they occur and can take remedial action. By regularly performing the same types of synthetic transactions, a system of this technical solution can establish a baseline for normal behavior of a digital service. Upon detecting a deviation from the established baseline, the system can generate an alert notifying the operator of the digital service of a performance or availability issue.

For example, the digital service can include a collaboration service web site, sales management platform, or productivity software (e.g., word processing, spreadsheet application, presentation application, or cloud storage). The client device that accesses the digital service can be located at a residential location, such as their home location, house, apartment, or condominium. In some cases, the client device can include or refer to a physical device located at the residential location, and in some cases the client device can include or refer to a virtual machine hosted or running on one or more processors or servers in a cloud computing environment. The user's residential location can refer to a location that is different from a commercial location, such as the office or building of an organization. In some cases, the client device can include or refer to a physical device located at a commercial location, such as a branch office or retail site. A synthetic transaction generator can execute on the client device. The synthetic transaction generator can execute in a container on the client device.

An illustrative synthetic business transaction test on the collaboration service web site can include the following sequence of individual tests: 1) log into the web site homepage; 2) join a meeting; 3) wait in the meeting; 4) leave the meeting; and 5) log out. The system can detect a problem with one or more of these tests. To debug or better understand the problem in order to resolve the problem, an operator of the digital service can view the contents of the data packets that were sent between the client device and the web server providing the digital service. Viewing the contents allows for detailed troubleshooting, including inspecting the different hypertext transfer protocol ("HTTP") headers generated by both the client device and the server, the HTTP response codes generated for different subcomponents of an HTTP page, or code such as Javascript.

To obtain the data packets transmitted between the client device at the residential location and the server hosting the digital service, the client device can include a synthetic transaction generator that generates a packet capture trace file. The synthetic transaction generator can include or refer to a packet monitoring probe. The synthetic transaction generator can be a standalone device or software component executed by a client device.

However, it may be challenging to perform deep-packet inspection at the residential location due to the computationally intensive nature of performing such analytics. Further, due to the large number of client devices located at residential locations that are accessing cloud services, it is inefficient to deploy additional computational resources to each residential location to evaluate a performance of the cloud service as accessed from that residential location. Further, many client devices access digital services provided by servers using a secure network protocol, including, for example, a transport layer security ("TLS") protocol. For example, web browsers can access digital services provided by web servers using the hypertext transfer protocol secure ("HTTPS"). HTTPS can use the TLS protocol or other security protocol to encrypt the plaintext HTTP data. HTTPS can also be used by an application to exchange information with backend services. During the initial handshake phase of a secure session (e.g., TLS session), the client device and server use a key agreement algorithm to derive a set of key material that is known to both the client and server and that is unique to that secure session.

Thus, this technical solution can provide a synthetic transaction generator that captures packets with associated timestamps, and provides a packet trace file to a data processing system to replay or analyze the packet trace file in order to convert the synthetic transaction results from the synthetic transaction generator to deep-packet inspection results. By doing so, this technical solution can provide advanced packet analytics, performance evaluations, and visualization to services accessed at residential locations. The technical solution can decrypt the captured packets using key information stored in a log file prior to playing the packets, thereby allowing the data processing system to perform the deep-packet inspection to the Open Systems Interconnection ("OSI") layers 5 to 7 information even if the tests were made over HTTPS and therefore encrypted. Further, by decrypting the packets prior to replay or analysis, systems and methods of this technical solution can perform advanced troubleshooting of custom applications operated by an enterprise (e.g., cloud service provider or other organization) and facilitate resolving technical problems associated with a cloud service.

To do so, the synthetic transaction generator of this technical solution can capture packets generated for a synthetic transaction test at the output of the synthetic transaction generator to produce a packet capture trace file with timestamps. The packet capture trace file can include a time stamp for each packet in the packet trace file. The time stamp can correspond to when each packet in the packet capture trace file was received, detected, or stored. The synthetic transaction can include beacon packets that include metadata about the test, such as the identity of the synthetic transaction generator and the test being executed. The beacon packets can be sent or generated at the beginning of the test or end of the test. The client device can send the packet capture trace file with additional metadata to a data processing system that can perform deep-packet inspection. The metadata sent from the synthetic transaction generator to the data processing system can include the key material used to encrypt the HTTPS session. This key material can be used to decrypt the packets before they are replayed into or analyzed by the deep-packet inspection engine. In some cases, the key material can be used to decrypt the packets when they are displayed in a packet decode view (e.g., a graphical user interface provided by a performance manager). Replaying the packet stream into the deep-packet inspection engine can generate various performance metrics. The deep-packet inspection engine can use the relative time each packet was captured to generate metrics such as the time taken by the service to process a request and return a response. When packets are replayed in real-time, the timestamps in the capture can be used to retain the original relative timing between packets. In some cases, the deep-packet inspection engine can directly ingest the capture file and use the timestamps stored with every packet to analyze the packets and generate metrics.

FIG. 1A illustrates an example system 100 to generate synthetic transactions with packets. In brief overview, the system 100 can include, access or otherwise interface with one or more of a client device 104, service provider system 116 and data processing system 102. The client device 104 can include one or more processors. The client device 104 can include at least one synthetic transaction generator 134. The client device 104 can include at least one container 106. The client device 104 can include at least one synthetic transaction generator 134. The synthetic transaction generator 134 can be hosted in the container 106. The client device 104 can include at least one data repository 136. The client device 104 can communicate with a service provider system 116 via a network 105. The client device 104 can communicate with a data processing system 102 via network 105.

The data processing system 102 can include at least one packet data collector 126. The data processing system 102 can include at least one application performance manager 128. The data processing system 102 can include at least one analytics appliance 130. The analytics appliance 130 can be a hardware appliance or software-based virtual appliance executed by one or more processors of the data processing system 102. The analytics appliance 130 can include a replay service 132. The analytics appliance 130 can include a metric generator 138. The data processing system 102 can include or refer to one or more server 302 or data center 308 depicted in FIG. 3A.

The service provider system 116 can be hosted by a third-party cloud service provider. The service provider system 116 can be hosted in a public cloud, a co-location facility, or a private cloud. The service provider system 116 can be hosted in a private data center, or on one or more physical servers, virtual machines, or containers of an entity or customer. The service provider system 116 can provide a service 118. The service 118 can be accessed or tested over a network 105. The service 118 can be a SaaS application, such as a word processing application, spreadsheet application, presentation application, electronic message application, file storage system, productivity application, or any other SaaS application. The service provider system 116 can be hosted or refer to cloud 310 depicted in FIG. 3B.

The data processing system 102, client device 104, or service provider system 116 can include or execute on one or more processors or computing devices (e.g., computing device 303 depicted in FIG. 3C) and communicate via network 105. The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be presented, output, rendered, or displayed on at least one computing device, such as a laptop, desktop, tablet, personal digital assistant, smart phone, portable computers, or speaker. For example, via the network 105 the client device 104 can access information or data provided by the service 118.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS"), universal mobile telecommunications system ("UMTS"), third generation wireless mobile telecommunications ("3G"), fourth generation wireless mobile telecommunications ("4G"), long term evolution wireless broadband communication ("LTE"), fifth generation wireless mobile telecommunication ("5G"), etc. Different types of data may be transmitted via different protocols, or the same types of data may be transmitted via different protocols.

Each of the client device 104, data processing system 102, or service provider system 116 can include or utilize at least one processing unit or other logic device such as a CPU, or module configured to communicate with one another or other resources or databases. The components of the client device 104, data processing system 102, and service provider system 116 can be separate components or a single component. The system 100 and its components can include hardware elements, such as one or more processors, logic devices, or circuits.

Still referring to FIG. 1A, and in further detail, the system 100 can include a client device 104. The client device 104 can include or execute a proxy application 140. The client device 104 can include or execute one or more client applications 146. The client device 104 can include or execute a synthetic transaction generator 134. The client device 104 can include or access a data repository 136. The data repository 136 can include information that facilitates performing synthetic transactions such as a test and key information.

The proxy application 140 can refer to or include any program configured to access a digital service 118 provided by a service provider system 116. The proxy application 140 can include, for example, a web browser that can communicate using a network protocol with a service provider system 116 that provides a service 118. The proxy application 140 can include a mobile application, desktop application or other type of application that can access a digital service 118 provided by the service provider system 116. The proxy application 140 can be a proxy for or represent a client application 146 that can be utilized by a user of the client device 104 to access the service 118 provided by the service provider system 116. The proxy application 140 can be a headless browser or other application that can be used by the synthetic transaction generator 134 to perform the test. The synthetic transaction generator 134 can use the proxy application 140, or otherwise interface or communicate with the proxy application 140 to facilitate conducting the test of the service 118.

The proxy application 140 can be located in the container 106, whereas the client application 146 can be located outside the container 106. For example, the client application 146 can refer to a browser, or other application that can execute on an operating system of the client device 104. A user of the client device 104 can use the client application 146 to access the service 118, or perform or execute other tasks on the client device 104. In implementations, the client application 146 can utilize the split VPN 110. In implementations, the proxy application 140 can utilize the split VPN 110. The proxy application 140 can include one or more function or component of the client application 146. The proxy application 140 can be configured to interface with the synthetic transaction generator 134.

The client device 104 can be located or deployed at any location in the network environment depicted in FIG. 1. The client device 104 can be deployed at a location 112. The location 112 can include a location in which it may be challenging to deploy a probe. The location 112 can be a location that does not include a probe, or where it may be difficult or not desired to provide a probe. For example, the location 112 can refer to a residential location or non-commercial location, such as a user's home, house, apartment, condominium or other residential place. The location 112 can refer to where a user lives. The location 112 can be different from a commercial location or building at which an organization or entity may have its place of business. For example, the location 112 can be different from where the data processing system 102 is located or where the service provider system 116 is located. In some cases, the location 112 can be a commercial location, such as a small branch office, a retail site, or a public space (e.g., an airport or library). Thus, this technical solution can apply to a situation in which synthetic tests are generated on a client device 104.

The client device 104 can include a synthetic transaction generator 134 designed, constructed and operational to simulate activities performed by a proxy application 140 accessing the digital service 118. The synthetic transaction generator 134 can include hardware or software that can emulate the behavior of the proxy application 140 or client application 146, or interface or control the proxy application 140. In implementations, the synthetic transaction generator 134 can be configured with one more functions or components of client application 146 in order to simulate the activities performed by the client application 146 to access the digital service 118. The synthetic transaction generator 134 can communicate with the service provider system 116 to perform activities simulating accessing the digital service 118. The synthetic transaction generator 134 can communicate with the cloud service provider 116 via the proxy application 140 to perform activities. In implementations, the synthetic transaction generator 134 can invoke or launch the proxy application 140. For example, the synthetic transaction generator 134 can launch the proxy application 140 and control the proxy application 140 in order to simulate the activity associated with the digital service 118. The synthetic transaction generator 134 can launch the proxy application 140 within the container 106. The synthetic transaction generator 134 can be a standalone application that includes the functionality of the proxy application 140 in order to conduct a synthetic transaction with the service 118, or interface with the proxy application 140 to conduct the synthetic transaction with the service 118. The synthetic transaction generator 134 can launch the proxy application 140 (e.g., a browser) to transmit packets to access the service 118.

The synthetic transaction generator 134 can execute in a container 106 on the client device 104. A container 106 can refer to delivering software in packages. Containers 106 can be isolated from one another and bundle their own software, libraries, and configuration files. Containers 106 can communicate with other components through a channel. The synthetic transaction generator 134 can include software in a package that forms or is hosted in a container 106. The package can include the synthetic transaction generator 134 application and its dependencies that can run on various operating systems that can run on the client device 104.

The container 106 can include, be based on, or associated with various container components, such as a daemon, objects, and registries. The container 106 can include a daemon, which can be a persistent process that manages the container 106 and handles container objects. The daemon can listen for requests sent via a container engine application programming interface ("API"). The container can include objects, which can refer to various entities that can assemble an application, such as the synthetic transaction generator 134, in the container 106. Classes of objects can include, for example, images, containers, and services. The container class can refer to a standardized, encapsulated environment that runs applications, such as the synthetic transaction generator 134. The image class can refer to a read-only template that can be used to build containers. The image can be used to store and ship applications, such as the synthetic transaction generator 134. The service class allows containers 106 to be scaled across multiple daemons, resulting in a swarm, or set of cooperating daemons that communicate through a container API. The container registry can be a repository of container images. Thus, the client device 104 can establish the container 106 on an operating system of the client device 104 that can run multiple applications outside the container 106, and the container 106 can include code to execute the synthetic transaction generator 134 in a stand-alone format.

The synthetic transaction generator 134 can be deployed in the container 106 in a manner that includes all its dependencies and isolates the application from the underlying infrastructure, allowing the synthetic transaction generator 134 to execute on various computing environments in a reliable manner. The synthetic transaction generator 134 can be deployed or hosted in the container 106 on the client device 104. The proxy application 140 can similarly be deployed in the container 106 in a manner that includes all its dependencies and isolates the proxy application.

The synthetic transaction generator 134 can access a test stored in the data repository 136 comprising instructions for executing a test to simulate activity in connection with the digital service 118. The test (or test data) can refer to or include a data structure or data files corresponding to the test. The test can include, for example, a script or instructions regarding types of tests to perform, when to perform the test, and what transactions or activities to simulate for the test. The test data can indicate to perform the test based on a time interval or an event. For example, the time interval can indicate to perform the test at certain times of the day on certain days of the week or month. The time interval can indicate, for example, to perform a test every hour (or every 5 minutes, 10 minutes, 20 minutes, 30 minutes, 2 hours or other time interval) during the weekend (e.g., Saturdays and Sundays). In some cases, the test data can indicate to perform a test of the service 118 responsive to an event, such as when the client device 104 enter a certain state (e.g., boots up, or enters an inactive or standby state). In some cases, the synthetic transaction generator 134 can execute the test responsive to a request. The request can be from a remote system such as the data processing system 102 or a user of the client device 104. For example, the data processing system 102 can determine to conduct a test of the service 118 based on a schedule, trigger, event, or user instruction. Responsive to determining to conduct a test of the service, the data processing system 102 can transmit an instruction to the synthetic transaction generator 134 to initiate execution of the test of the performance or availability of the service 118.

The synthetic transaction generator 134 can initiate execution of a test of the digital service 118 in order to facilitate determining the availability or performance of the digital service 118. To do so, the synthetic transaction generator 134 can access test data to select a type of test to perform. The types of tests can be predetermined and stored in the test data in data repository 136 or accessed from a different data store via network 105 or accessed via a peripheral device connected to the client device 104. The user or operator of the data processing system 102 or client device 104 can select the type of test to perform from a set of tests stored in test data.

Upon selecting a type of test to perform, the synthetic transaction generator 134 can initiate execution of the test. The synthetic transaction generator 134 can initiate execution of the test via the proxy application 140. The synthetic transaction generator 134 can convey information about the test to using various techniques. In some cases, the synthetic transaction generator 134 can store meta data in a packet capture trace file.

In some cases, the synthetic transaction generator 134 can generate different types of beacon packets that indicate different information, such as a start beacon packet, key beacon packet, or stop beacon packet (or end beacon packet). The start beacon packet can indicate the beginning of a test, and the stop (or end) beacon packet can indicate the end of the test.

The synthetic transaction generator 134 (or via proxy application 140) can transmit packets using any network protocol. For example, the synthetic transaction generator 134 can transmit packets using transmission control protocol ("TCP") on the same destination port as the test traffic (e.g., TCP port 443), so they follow the same path as the test traffic. The beacon packets, if used by the synthetic transaction generator 134, can be configured so as not to reach the digital service 118 or be discarded by the digital service 118 or service provider system 116. For example, the beacon packets can be configured with a time-to-live ("TTL") value that can prevent the beacon packets from reaching the service 118. If the beacon packets reach the end service provider system 116 because the TTL was not set or the value of the TTL was too long, the service provider system 116 or digital service 118 can reject the beacon packets. For example, the service provider system 116 or digital service 118 may reject the beacon packets as being malformed or of an unknown type, causing the digital service 118 to ignore the beacon packet. In some cases, the beacon packets can be sent using a non-standard TCP destination port, or a different IP protocol, such as user datagram protocol ("UDP") or Internet Control Message Protocol ("ICMP"). Beacon packets can be sent using a different client port number from the test traffic to ensure that if beacon frames that are sent during the test reach the digital service 118, the beacon frames will not interfere with the session carrying the test traffic because they are sent using a different client port number. When the service being tested uses plaintext HTTP, the beacon frames can use a dummy Universal Resource Locator ("URL") value. The dummy URL value can refer to or include a placeholder URL, test URL, example URL, or predetermined URL value. The dummy URL can have a template or format that matches, corresponds with, or is otherwise consistent with a real URL.

The meta data associated with the test can include information about the source internet protocol ("IP") address of the client device 104, an indication of the type of test or other identifier associated with the test. The test identifier can include numeric values, alphanumeric values, symbols, or other characters that can indicate the type of test or otherwise identify the test. The meta data can include a destination IP address. The destination IP address can correspond to the service provider system 116, or digital service 118. The URL of the service can be specified by, or pre-programmed in, the test. The DNS can resolve the URL when the test is run. In some cases, the resolved address of the service can be included in the meta data. The synthetic transaction generator 134 can access the destination IP address of the digital service 118, and then populate the destination IP address field in the header of a packet with the retrieved destination IP address.

The client device 104 and service provider system 116 (or service 118) can establish a secure communication channel or secure communication session. For example, the client device 104 and the service provider system 116 can communicate using HTTPS requests and responses. HTTPS responses and requests can refer to HTTP responses and requests that are encrypted, such an encryption based on the TLS protocol.

To encrypt data packets using the TLS protocol or HTTPS, the client device 104 (e.g., synthetic transaction generator 134 or proxy application 140) and service provider system 116 (or digital service 118) can perform a handshake (e.g., TLS handshake). During the initial handshake phase of a TLS session, for example, the client device 104 and service provider system 116 can use a key agreement algorithm to derive a set of key material that is known to both the client device 104 and the service provider system 116, and that is unique to that TLS session. The key agreement mechanisms can be configured such that if an eavesdropper only has access to the TLS handshake packets, the eavesdropper cannot determine the key material. For example, the TLS handshake can include the client device 104 and the service provider system 116 specifying which version of TLS to use for the secure communication session, deciding on which cipher suit to use, authenticating the identity of the service provider system 116 via a public key of the service provider system 116 and a digital signature of the secure socket layer ("SSL") certificate authority that issued the public key to the service provider system 116, and generating session keys in order to use symmetric encryption after the handshake is complete.

The service provider system 116 can use various types of key agreements. For example, the service provider system 116 can use a Rivest-Shamir-Adleman ("RSA") key agreement or static Diffie-Hellman ("DH") key agreement. RSA and DH key agreements can use a static secret key that is installed on the service provider system 116. The service provider system 116 can use a key agreement that does not use static keys. For example, the service provider system 116 can use an Ephemeral Diffie-Hellman ("DHE") key agreement. In DHE key agreement, no static secret keys can be shared with the probe in advance. Thus, when a synthetic test is made to a service 118 operated by a third-party, then any static keys (if used) may not be available to the synthetic transaction generator 134.

Upon completing the handshake process, the synthetic transaction generator 134 (or via proxy application 140) can perform synthetic transactions by exchanging encrypted data packets with the digital service 118 provided by the service provider system 116. For example, if the digital service 118 is a collaboration service web site, then the synthetic transaction generator 134 can perform one or more of the following tests: 1) log into the web site homepage; 2) join a meeting; 3) wait in the meeting; 4) leave the meeting; and 5) log out. The system can detect a problem with one or more of these tests. Each of these five tests can include one or more synthetic transactions, which can include the exchange of data packets between the client device 104 and the digital service 118. Thus, to perform a test, the synthetic transaction generator 134 can generate data packets corresponding to HTTPS requests and transmit the data packets to the digital service 118. The digital service can generate HTTPS responses to the requests and transmit the responses to the client device 104.

In an illustrative example, the synthetic transaction generator 134 can begin the test by deleting a log file storing information on the client device 104. In implementations, the synthetic transaction generator 134 can transmit an instruction to the proxy application 140 to delete the log file. The log file can be stored in data repository 136. The log file can refer to an SSLKEYLOG file. The synthetic transaction generator 134 can delete, reset, erase, or otherwise clear the log information stored in the data repository 136 upon initiation of the test. The synthetic transaction generator 134 can use a proxy application 140 (e.g., a script, tool, or web browser) to execute the test, which can result in multiple HTTPS transactions. For example, the synthetic transaction generator 134 can record the encrypted packets. Thereafter, once the test is complete, the synthetic transaction generator 134 can use the locally stored SSLKEYLOG to decrypt the encrypted packets and create a new, decrypted packet capture trace file.

The proxy application 140 can generate individual or sequences of HTTP requests to the service provider system 116. The proxy application 140 can provide browser functionality to complete a transaction, for example executing JavaScript code. The proxy application 140 can include or refer to a tool such as a "headless" version of a web browser.

The proxy application 140 can provide SSLKEYLOG feature. To use this feature, an operating system environment variable called SSLKEYLOG specifies the path and name of a file (e.g., key info). Once this variable is set, every time the proxy application 140 establishes a new TLS connection, the proxy application 140 can write the key material for the session into the key info file specified in the environment variable. Digital services 118 such as web pages can include links to other objects, such as images, which could be hosted on the same web server or an entirely different web site. In another example, the proxy application 140 can directly access a different server system to obtain certain data. As a result, a single HTTPS request can cause the proxy application 140 to initiate multiple HTTPS requests either directly or via the service 118. Therefore, the key info (e.g., SSLKEYLOG file) can include entries for multiple TLS sessions. The multiple entries can be transmitted to the synthetic transaction generator 134 using one or more beacon packets (e.g., one or more key beacon packets or stop beacon packets).

Once the test is complete and the encrypted packets are recorded, the synthetic transaction generator 134 can access the locally stored SSLKEYLOG to decrypt the encrypted packets. The synthetic transaction generator 134 can then generate a new packet capture trace file with the decrypted packets. The new packet capture trace file can include time stamps for each recorded packet in the packet capture trace file. The time stamps can correspond to when the encrypted packets were recorded or received by the synthetic transaction generator 134.

The synthetic transaction generator 134 can record the packets associated with the test executed by the synthetic transaction generator 134. The synthetic transaction generator 134 can include a packet interceptor, virtual probe, or monitor designed, constructed and operational to intercept packets. The packet interceptor can intercept or make copies of packets of the network traffic from the client device 104, the synthetic transaction generator 134, or the proxy application 140. The packet interceptor can be passive or active and include software, firmware, and/or hardware components, such as taps, probes, or port mirrors that can be integrated with client device 104. In implementations, the proxy application 140 can include the packet interceptor, virtual probe, or monitor.

The synthetic transaction generator 134, or packet interceptor, virtual probe, or monitor thereof, can apply a time stamp when a packet is identified, received, detected, or otherwise intercepted at or from the virtual interface of the container 134. The time stamp can correspond to when the packet is received by the synthetic transaction generator 134 or when the packet is recorded, stored or detected by the synthetic transaction generator 134. The synthetic transaction generator 134 can associate a different time stamp for each packet.

The synthetic transaction generator 134 can be deployed on a same local network as the client device 104. The synthetic transaction generator 134 can deployed at a network gateway or router deployed at a location of the client device 104. The synthetic transaction generator 134 can access a virtual interface of the container 106 and access at least a portion of network traffic flowing through network 105 from the client device 104.

The container 106 can have its own internal virtual network interface. The internal virtual network interface can allow the synthetic transaction generator 134 to collect packets that are flowing to and from the container 106. The synthetic transaction generator 134 can collect or capture only packets that are flowing to or from the container 106, without collecting other packets. By collecting only packets flowing to and from the container 106, the synthetic transaction generator 134 can avoid or prevent the packet trace from being corrupted by other applications 146 running on the operating system of the client device 104. However, in implementations, if there are no other client applications 146 executing on the client device 104, then the synthetic transaction generator 134 may not be hosted in the container 106. For example, if a user is not using any other client applications 146, then there is no or minimal risk of the packet trace being corrupted, and the synthetic transaction generator 146 can conduct the test of the service 118 without invoking the container 106.

The synthetic transaction generator 134 can initiate a packet capture on a communication port of the client device 104 or on a virtual interface of the container 106, if a container 106 is invoked for the test. The synthetic transaction generator 134 can initiate the packet capture to generate a packet capture trace file (e.g., PCAP file). The synthetic transaction generator 134 can use a PCAP API to capture the network traffic. The synthetic transaction generator 134 can use various APIs to capture the network packets. For example, the synthetic transaction generator 134 can utilize libpcap (e.g., libraries, drivers, or ports for Unix-like operating systems), WinPcap (e.g., libraries, drivers, or ports for Windows NT operating systems), Npcap (e.g., libraries, drivers, or ports for Windows operating systems), or Win10Pcap (e.g., e.g., libraries, drivers, or ports for Windows 10 operating systems) to perform packet-capture and filtering functions, and save the packets in a packet capture trace file.

Prior to running the synthetic transaction test, the synthetic transaction generator 134 can begin a packet capture on a port or the internal virtual interface of the container 106, if the container 106 is used for the test. The synthetic transaction generator 134 can apply one or more filters so that non-test traffic from the operating system are not included in the packet trace. For example, the synthetic transaction generator 134 can utilize 'tcpdump' function of Linux to perform the packet capture with filtering. The filter can prevent storage of one or more packets in the packet capture trace file that do not correspond to the test of the service 118 provided by the cloud service provider 116. The synthetic transaction generator 134 can filter packets based on a source or destination IP address or destination TCP or UDP port in the header of the packets. The synthetic transaction generator 134 can establish the filter for the synthetic transaction generator 134 upon initiating the test of the service 118. For example, the synthetic transaction generator 134 can provide the values or filter to the synthetic transaction generator 134 to use to determine which packets to capture in the PCAP file.

When synthetic tests and associated beacon frames are generated, the beacon frames or beacon packets can be used to mark the start and end of a synthetic test thereby allowing probes along the route to detect synthetic tests and analyze them as such. However, once the beacon packets leave the client device 104, it may not be possible to separate the beacon packets from packets generated by other applications executing on the client device 104. Further, the network traffic leaving the ISP router 122 can include packets from additional devices attached to the ISP router 122 at the location 112 or workplace. This means that probes outside the container 106, further along the path cannot make use of the beacon frames to identify which packets belong to a synthetic test, and which packets do not belong to the synthetic test. As a result, the beacon frames used for tests from the synthetic transaction generator 134 can use a different type of beacon frame than used by a dedicated synthetic test generator.

The synthetic transaction generator 134 can establish a log file for the test in the data repository 136. For example, in addition to the PCAP file, the synthetic transaction generator 134 can establish a log file. The synthetic transaction generator 134 can establish a log for the test responsive to receipt of the start beacon packet or other indication that the test of the service 118 is beginning. Receipt of the start beacon packet indicating the beginning of the test can cause the synthetic transaction generator 134 can establish a log file in the data repository 136.

The synthetic transaction generator 134 can establish a log with a unique identifier. The log file can include information associated with the test, such as the test type identifier, the source IP address of the client device 104 conducting the test, the type of digital service 118, a time and date stamp for the test, or other information associated with the test. The synthetic transaction generator 134 can create a unique identifier for the test and assign the unique identifier to the log file stored in the data repository 136. The synthetic transaction generator 134 can generate the unique identifier using any technique. For example, the synthetic transaction generator 134 can generate the unique identifier based on one or more of the source IP address, test type identifier, or timestamp. Thus, the synthetic transaction generator 134 can establish the log for the test with the source IP address, the test type identifier, and a unique identifier. The unique identifier can correspond to an identifier of the synthetic transaction generator 134, or be a public IP address associated with the client device 104. The synthetic transaction generator 134 can mark (e.g., flag, tag, or otherwise assign an identifier) the start beacon packet with the test type identifier and the unique identifier. The synthetic transaction generator 134 can store the start beacon packet marked with the test type identifier and the unique identifier in the log file.

The synthetic transaction generator 134 can store data packets in the packet capture trace file transmitted between the client device 104 and the digital service 118 based on the start beacon packet. The data packets can be encrypted with the key established by the client device 104 and the service provider system 116 during the TLS handshake process. The synthetic transaction generator 134 can store the data packets received between the start and stop beacon packets in the packet capture trace file and the log file established for the test responsive to receipt of the start beacon packet.

The synthetic transaction generator 134 can store information about the sequence of data packets in the log file. The synthetic transaction generator 134 can store time stamps associated with the data packets exchanged between the client device 104 and service provider system 116 during the test. In the event that different tests are conducted, the synthetic transaction generator 134 can create a new log file for each test so as to maintain data packets associated with different tests separately.

The synthetic transaction generator 134 can store metadata associated with the test. The synthetic transaction generator 134 can store the metadata in the log file, pcap file, or other file. For example, the synthetic transaction generator 134 can store, for one or more of the packets, information about an Internet Service Provider ("ISP") associated with the client device 104, a location 112 of the client device 104, and an identifier of the client device 104.

The ISP can refer to the provider of the ISP router 122. The ISP can refer to an entity or organization that provides services for accessing, using or participating in the Internet. The ISP can provide or serve as an access point or the gateway that provides the client device 104 access to resources available on the Internet. For example, the ISP can provide an ISP router 122. The client device 104 can connect with the ISP router 122 to access the data processing system 102 or service provider system 116.

The client device 104 can access certain resources on the network 105 via a secure network protocol. The client device 104 can access certain resources on the network 105 via an unsecured network protocol. For example, the client device 104 can establish a secure communication channel to interface with the data processing system 102, such as a Virtual Private Network ("VPN") 134. The VPN 134 can be an enterprise network VPN connection. The client device 104 can access the service provider system 116 without using a VPN. Rather, the client device 104 can establish a direct network connection for SaaS application 118. The direct network connection 120 can be different from the VPN 134 connection. Thus, the client device 104 can have a split VPN 110 connection whereby the client device 104 can establish a direct network connection 120 for SaaS apps provided by the service provider system 116, while using a VPN 134 connection to access the data processing system 102.

The network 105 can include a portion at the location 112 that includes a home or residential LAN IP address 114. The residential IP address 114 can be 192.168.1.45, for example. The ISP router 122 can connect the client device 104 to the internet using an ISP public IP address 124. The ISP public IP address 124 can be 118.34.25.67, for example.

The synthetic transaction generator 134 can capture packets transmitted from the client device 104 to the cloud service provider system 116 to access the service 118 over the direct network connection 120. The synthetic transaction generator 134 can store the packet capture trace file as well as additional metadata or files. For example, the synthetic transaction generator 134 can store a log file, and a public internet protocol ("IP") address 124 of the synthetic transaction generator 134. In implementations, the synthetic transaction generator 134 can be identified using a unique identifier in addition to, or instead of, the public IP address 124. For example, an administrator or user of the synthetic transaction generator 134 can establish a unique identifier for the synthetic transaction generator 134, or a unique identifier can be assigned to the synthetic transaction generator 134 prior to performing a test. The synthetic transaction generator 134 can determine a location of the client device 104, such as the location 112, and include the location 112 as part of the metadata. Metadata can include an identifier of the client device 104, such as a device name, username, or other identifier established in the operating system of the client device 104.

Upon completion of the test, the synthetic transaction generator 134 can stop recording packets in the packet capture trace file. The synthetic transaction generator 134 can decrypt the recorded packets using key information retrieved from an SSKEYLOG, and then provide the packet capture trace file with unencrypted packets and other metadata to the data processing system 102 for processing. In implementations, the synthetic transaction generator 134 can transmit a stop beacon packet upon completion of the test. The stop beacon packet can include information identifying the test, such as the source IP address of the client device 104, or the test type identifier. The synthetic transaction generator 134 can store the stop beacon packet in the log file for the test. The synthetic transaction generator 134 can terminate the packet capture responsive to completion of the test of the service 118 provided by the service provider system 116 (e.g., as indicated by the stop packet or other indication).

The synthetic transaction generator 134 can stop or terminate the packet capture. The synthetic transaction generator 134 can release the log file to complete the test. Releasing the log file can refer to or include closing the file such that additional data is not written to the log file. Releasing the log file can refer to closing it and renaming it. Releasing the log file can refer to or include changing permissions or access rights to the file from read/write to read-only. Releasing the log file can refer to include an indication in the log file that the test is complete. Releasing the log file can refer to or include transmitting the log file to another system for further processing. Thus, the synthetic transaction generator 134 can release, responsive to the stop beacon packet, the log file to prevent data packets received subsequent to the stop beacon packet from being stored in the log file established for the test.

The synthetic transaction generator 134 can identify or receive key information that can be used to decrypt the data packets of the test that were encrypted with the key using the TLS protocol. The synthetic transaction generator 134 can receive the key material from an SSLKEYLOG file, from a key beacon packet, or the synthetic transaction generator 134 can receive a stop beacon packet that contains the key material. The synthetic transaction generator 134 can store the key material in the log for the test. The synthetic transaction generator 134 can store the stop beacon containing the key material in the log for the test. The synthetic transaction generator 134 can store the key material to allow a future process to decrypt the data packets.

The synthetic transaction generator 134 can use the key information or key material to decrypt the packets that were encrypted during the test. The synthetic transaction generator 134 can generate a PCAP file with the decrypted packets. The PCAP file can include the decrypted packets, as well as a time stamp for each of the decrypted packets. The synthetic transaction generator 134 can delete the encrypted PCAP file, generate a new decrypted PCAP file, or re-write the encrypted PCAP file with the decrypted PCAP file. In some cases, the synthetic transaction generator 134 can replace the encrypted packets in the PCAP file with decrypted packets.

The synthetic transaction generator 134 can transmit the packet capture trace file to a data processing system 102. The synthetic transaction generator 134 can transmit the packet capture trace file to the data processing system 102 responsive to termination of the test or packet capture. The synthetic transaction generator 134 can provide key information (e.g., SSL keys) associated with the test, and additional metadata (e.g., public IP address 124, unique identifier of the synthetic transaction generator 134, location 112, or an identifier of the client device 104). If the synthetic transaction generator 134 decrypts the packets and generated a packet capture trace file with decrypted packets, the synthetic transaction generator 134 may not send key material to the data processing system 102 as the data processing system 102 may not need the key material to decrypt packets. The data processing system 102 can play the packet capture trace file to execute the test of the service 118 provided by the service provider system 116.

The synthetic transaction generator 134 can transmit the packet capture trace file using an HTTPS POST request. The synthetic transaction generator 134 can send the HTTPS POST request to an IP address of the replay service 132 on the data processing system 102. The HTTPS POST request can include the packet capture trace file, the log file (e.g., the newly created SSLKEYLOG file), and the public IP address 124 or a unique identifier of the synthetic transaction generator 134.

In a location 112, the public IP address can be the unique public address of the ISP router 122. The synthetic transaction generator 134 can be configured with one or more techniques to obtain the public address 124 of the ISP router 122, its geographical location and the identity of the ISP. In implementations, the synthetic transaction generator 134 can be assigned or generate a unique identifier that can identify the synthetic transaction generator 134. The unique identifier can be used instead of, or in addition to, the public IP address 124.

The system 100 can include a data processing system 102 designed, constructed and operational to receive a packet capture trace file, log file, or other metadata from the synthetic transaction generator 134 to evaluate a performance of a service 118 provided by the service provider system 116. The data processing system 102 can receive data from the synthetic transaction generator 134 via a VPN 134. The data processing system 102 can include a packet data collector 126. The packet data collector 126 can collect the synthetic test results, packet trace and associated meta-data for each synthetic test and relay that data to a specified analytics appliance 130 for processing. This data can be sent via a communication mechanism within the data processing system 102 of between the components of the data processing system 102 to alleviate firewall concerns and avoid introducing any additional ports and protocols.

The packet data collector 126 can store packet and meta data for each synthetic test. The packet data collector 126 can allow an administrator, user or other operator of the data processing system 102 to specify an analytics appliance 130 to which to send the data for the synthetic test. The packet data collector 126 can allow the administrator to specify synthetic transaction generators 134 and synthetic tests on which to capture the test data. The packet data collector can receive the test data (e.g., packet capture trace file, log file, key information, and metadata) from each synthetic transaction generator 134. The packet data collector 126 can relay the test data from the synthetic transaction generator 134 for each synthetic test to the configured analytics appliance 130.

The data processing system 102 can include an application performance manager 128. The application performance manager 128 can allow a user or operator of the data processing system 102 to select a packet trace via a graphical user interface ("GUI"). In some cases, the packets in the packet capture trace file received from the client device 104 can be decrypted. If the packets in the received packet capture trace file were not previously decrypted, the application performance manager 128 can further provide an option via the GUI to select SSL decryption. In some cases, the SSLKEYLOG information for a test can be appended to a keylog file on the analytics appliance 130, which can then be available for use in a packet decode view of the appliance performance manager 128.

A user of the data processing system 102 can drill down or navigate through the GUI provided by the application performance manager 128 to identify, evaluate, generate or otherwise assess various metrics, such as the synthetic transaction test response time, the ISP, location information, the unique ID of the synthetic transaction generator 134, and the laptop name or user identifier.

The application appliance 130 can include a replay service 132 designed, constructed and operational to play the packet capture trace file. The replay service 132 can receive information from the client device 104, such as the packet capture trace file, SSL keys, and metadata. For example, the replay service 132 can receive HTTPS POST requests from the synthetic transaction generator 134 and replay the packets. The replay service 132 can be located in the data processing system 102, an analytics appliance 130, be a standalone server, or a virtual machine.

The replay service 132 can play (or replay) the packet capture trace file in real-time by maintaining time intervals between packets of the packet capture trace file. The replay server 132 can play the packets in the packet capture trace file based on the time stamps for the packets in the packet capture trace file. The replay service 132 can replay the packets in the packet capture trace file by maintaining the relative spacing between the packets. The replay service 132 can use the time stamps for each of the packets to replay the packets in a manner that maintains the relative spacing between the packets. The replay service 132, by minimizing or stabilizing latency, can replay the packets in real-time by keeping the relative timing of the packets similar (e.g., within 1%, 2%, 3%, 5% or other percentage) of the timings as detected by the synthetic transaction generator 134. Thus, when replaying the packets, the replay service 132 can be configured to avoid or prevent introducing any additional latency or delay between the packets such that the spacing between the packets corresponds to the timestamps of the packets, thereby allowing the metric generator 138 to accurately and reliably evaluate the performance of the digital service 118.

When the replay service 132 receives the HTTPS POST from the synthetic transaction generator 134, the replay service 132 can use the SSLKEYLOG information to produce a new version of the packet capture trace file with the TLS payloads decrypted. The replay service 132 can replay the packet capture trace file with the source IP address (e.g., home LAN IP address 114) rewritten to match the public IP address 124 of the synthetic transaction generator 134. The replay service 132 can use Linux 'tcprewrite' and 'tcpreplay' tools to replace the source IP addresses and replay the packets.

The replay service 132 can modify a source internet protocol ("IP") address of each of the packets stored in the packet capture trace file based on an IP address of an Internet Service Provider of the client device 104. The replay service 132 can play the packets of the packet capture trace file the modified source IP address. In implementations, the synthetic transaction generator 134 can modify the source IP address on the packets when generating the packet capture trace file, prior to transmitting the packet capture trace file to the data processing system 102.

For example, the replay service 132 (or synthetic transaction generator 134) can rewrite the source IP address to address certain technical challenges posed by having the synthetic transaction generator at the location 112 and behind the Home LAN IP address. The Home LAN IP address may be the same for synthetic transaction generator 134 located at different residential location. The IP address in the container 106 can be a generic class C IP address, e.g. 192.168.0.1, with no meaning outside the container 106. The public IP address 124 of the ISP router 122 can be mapped to an ISP using publicly available information. Public IP addresses 124 can be globally unique, which means that packet capture from different synthetic transaction generators 134 can be replayed into the analytics appliance 130 (e.g., metric generator 138) in parallel.

By rewriting the source IP address, either by the synthetic transaction generator 134 or the replay service 132, this technical solution can provide a home monitoring service for hundreds of synthetic transaction generators 134 or PCAP traces in parallel. The replay service 132 can replay multiple traces in parallel by changing the source IP address to a unique IP address. In some cases, the data processing system 102 can be configured with a safety check to prevent multiple tests from the same synthetic transaction generator 134 from being played at the same time. For example, the replay service 132 can ensure that two tests with either the same public IP address 124 are not played at the same time. Thus, the replay service 132 can concurrently play back packet traces from different synthetic transaction generators 134.

In implementations where the packets in the packet capture trace file were not previously decrypted by the synthetic transaction generator 134, the replay service 132 can decrypt HTTPS prior to replaying the packets. The replay service 132 can use the SSLKEYLOG information to decrypt a trace using a packet decode function. The replay service 132, using the packet decode function, can decrypt synthetic test packets before they are replayed, opening up OSI layer 3 through layer 7 analysis in real-time.

For example, the replay service 132 can decrypt the packet capture trace file using key information stored in the log file to generate a second packet capture file comprising decrypted packets. The replay service 132 can play the decrypted packets of the second packet capture file. The second packet capture file can be similar to the packet capture trace file received from the synthetic transaction generator 134 via the HTTPS POST, but can be decoded or decrypted.

In implementations, the key material can be provided to the analytics appliance 130 and the analytics appliance 130 can decrypt the packets and analyze the packets. The analytics appliance 130 can execute a background process to age out old keys to avoid the key store growing indefinitely.

The data processing system 102 (e.g., analytics appliance 130) can include a metric generator 138 designed, constructed and operational to generate a metric or otherwise provide an indicator of the availability or performance of the digital service 118 being tested. The metric generator 138 can generate metrics as the replay service 132 plays back the packet capture trace file, or completion of the playback. The metric generator 138 can access the data packets decrypted by the replay service 132, and analyze the data packets. The metric generator 138 can identify a test status code in the packets that can indicate whether the test was a success. The metric generator 138 can determine a duration of the test, and generate a metric based on the duration of the test. The metric generator 138 can parse data in the data packets, such as data in the HTTP request and response data packets. The data can include codes indicating a status or state of the HTTP request or response.

The metric generator 138 can generate baseline metrics for the test. The baseline metrics can include, for example, a response time for each type of test. The metric generator 138 can determine the response time as a time delay between the first packet from the client device 104 to the last packet from the service provider system 116. The metric generator 138 can evaluate an error code or status code for a specific HTTP response stored in a data packet. The metric generator 138 can identify the error code or status code from the decrypted data packet. The metric generator 138 can generate a metric based on the number of error codes or types of error codes. For example, the metric can indicate that the test failed based on an error code indicating an error. The metric can indicate that the test passed based on the lack of an error code in the data packets. The metric generator 138 can evaluate URLs of the links in an HTTP page.

The metric generator 138 can provide information regarding the performance of the test. The metric generator 138 can compare the metric with a baseline metric stored. The baseline metric generated by the metric generator 138 based on historical tests, or can include predetermined thresholds established by an operator of the data processing system 102. The data processing system 102 can compare the metric generated for the test with a performance threshold stored in a threshold data structure, and generate an alert based on the comparison. The data processing system 102 can transmit the alert or a notification to an operator device, such as the client device 104, via a push notification, electronic message, text message, or other electronic communication.

In implementations, the data processing system 102 can read the packet trace file directly and use the timestamps available for each packet, rather than using the timestamps generated when the packets are replayed in real-time into the system. By using the time stamps provided in the packet capture trace file, the metrics can be associated with the timestamps of the actual synthetic test, rather than the replay packet capture trace file, and the each capture file can be processed faster than real-time.

In some cases, the data processing system 102 can be configured to provide an indication to adjust a configuration of the client device 104, digital service 118 or service provider system 116 based on the performance information or comparison between the metric and the threshold performance. The data processing system 102 can (e.g., automatically or responsive to the comparison) adjust or modify a configuration of the client device 104 or digital service 118 (e.g., application) executed by the one or more servers to improve performance of the digital service 118. For example, the synthetic transaction generator 134 can restart a server of the service provider system 116 that hosts the digital service 118, allocate additional memory or storage to the service 118, allocate a faster processor to the service 118, allocate additional network bandwidth to the service 118, or download a patch or software update to the service 118.

Figure 1B:
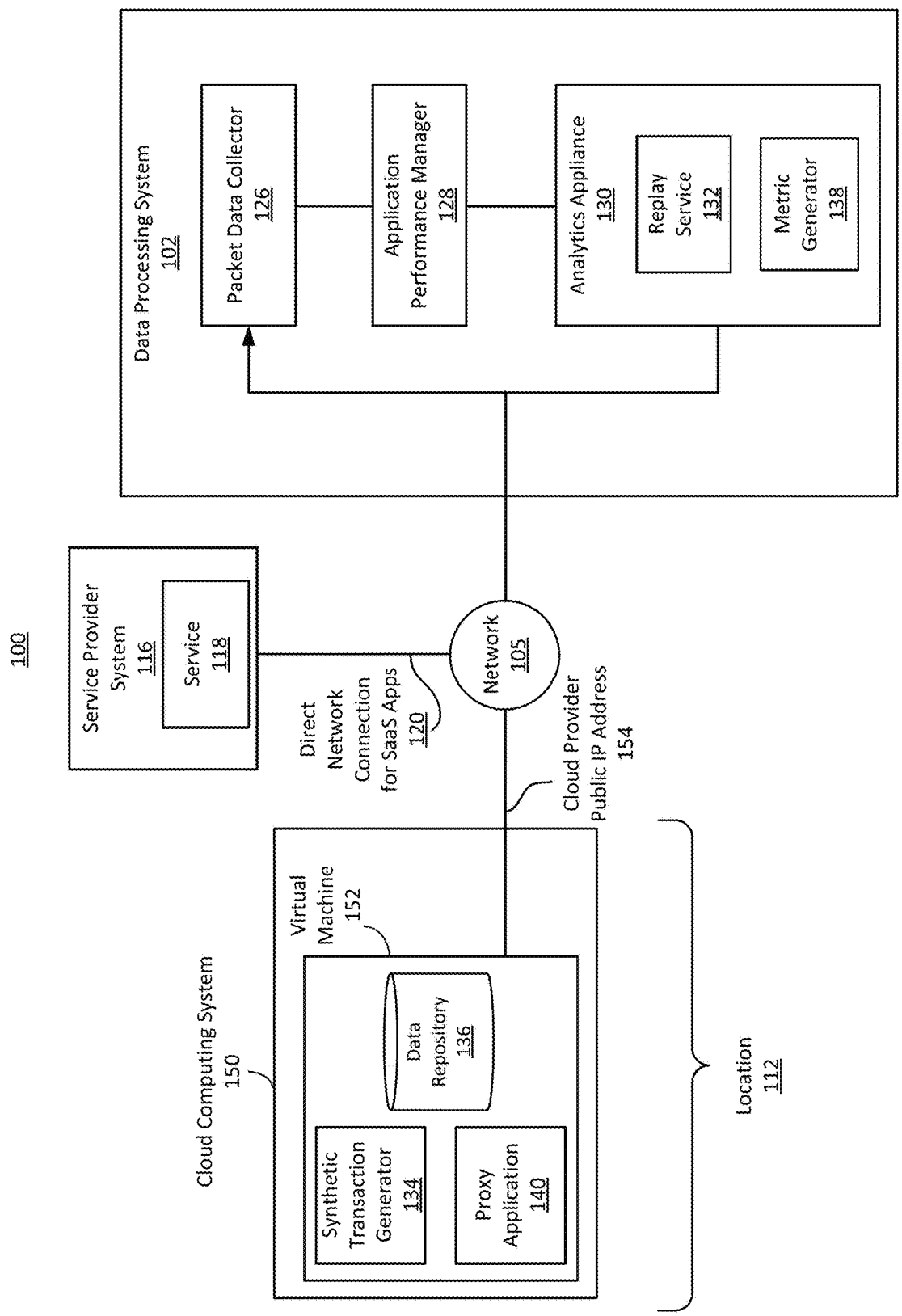
FIG. 1B is an illustration of a system to generate synthetic transactions, in accordance with an implementation.

FIG. 1B illustrates an example system 101 to generate synthetic transactions with packets. The system 101 can include one or more component or functionality of system 100 depicted in FIG. 1A, including, for example, a data processing system 102, synthetic transaction generator 134, data repository 136, service provider system 116, and service 118. The system 101 can include a cloud computing system 150. The cloud computing system 150 can include one or more servers, one or more processors, and memory. The cloud computing system 150 can be hosted at a data center with one or more servers. The cloud computing system 150 can refer to or be hosted on a cloud 310, as depicted in FIG. 3B. The cloud computing system 150 can be assigned or associated with a cloud provider public IP address 154. In implementations, the cloud computing system 150 can communicate with the data processing system 102 using a VPN, as depicted in FIG. 1A. In some implementations the cloud computing system 150 can communicate with the data processing system 102 without establishing a VPN.

The cloud computing system 150 can include or host a virtual machine 152. The virtual machine 152 can execute on one or more processors of the cloud computing system 150. The virtual machine 152 can have access to one or more processors or memory of the cloud computing system 150. The virtual machine 152 can provide one or more functionality of the client device 104. The virtual machine 152 can be the virtualization or emulation of a computer system such as the computer system of client device 104. The virtual machine 152 can include or be assigned an IP address. The virtual machine 152 can execute one or more applications, such as a proxy application 140. The virtual machine 152 can execute the synthetic transaction generator 134. The virtual machine 152 can execute the proxy application 140. The synthetic transaction generator 134 and proxy application 140 executing on virtual machine 152 can perform one or more function in a manner similar to that of synthetic transaction generator 134 and proxy application 140 executed on container 106 of client device 104, as depicted in FIG. 1A. For example, the virtual machine 152 can execute the proxy application, but may not execute any client applications 146 so as to prevent or preclude a packet trace from being corrupted with packets that are not part of the test of the service 118 conducted by the synthetic transaction generator 134.

For example, the synthetic transaction generator 134 can initiate a test of the service 118 by generating synthetic transactions that include packets. The synthetic transaction generator 134 can initiate the test in conjunction with the proxy application 140. The synthetic transaction generator 134 can transmit the packets to the service 118 via a network through the cloud computing system 150. The synthetic transaction generator 134 can record the packets transmitted by the virtual machine 152 and received from the service 118. The synthetic transaction generator 134 can generate a packet capture trace file with the packets, time stamps for the packets, and meta data associated with the test.

Figure 2A:
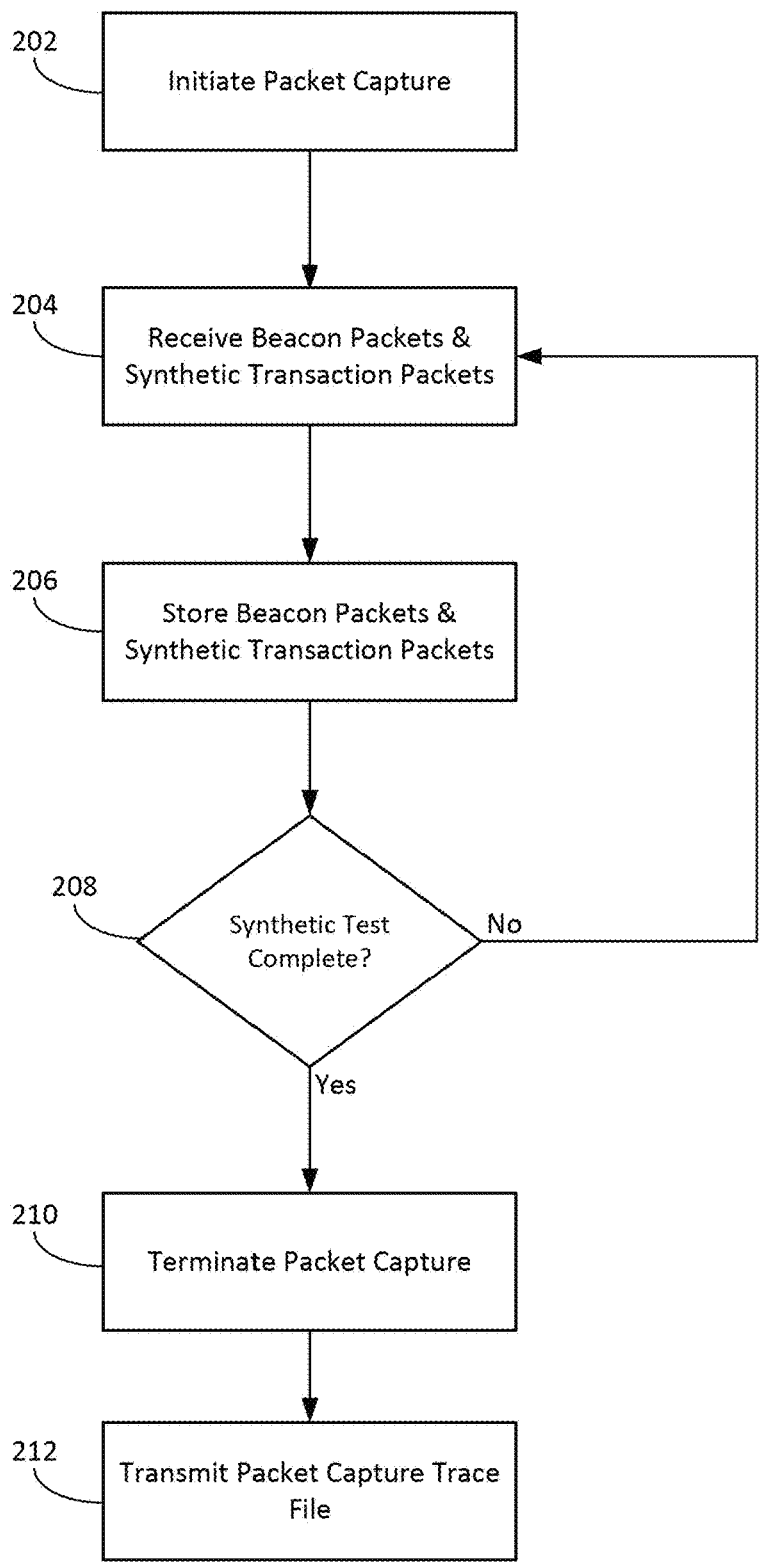
FIG. 2A is an illustration of a method of generating synthetic transactions, in accordance with an implementation.

FIG. 2A is an illustration of a method of generating synthetic transactions with packets, in accordance with an implementation. The method 200 can be performed by one or more system, component or module depicted in FIG. 1, 3A, 3B, or 3C, including, for example, a client device, synthetic transaction generator, data processing system, replay service, cloud service provider system. At ACT 202, the synthetic transaction generator can initiate a packet capture. The synthetic transaction generator can execute on one or more processors of a client device or a virtual machine hosted by a cloud computing system. The synthetic transaction generator can execute in a container if the one or more processors are executing other applications that transmit and receive packets that can interface with the test of the service.

The synthetic transaction generator can initiate the packet capture responsive to an indication that a synthetic transaction test is to occur. The synthetic transaction generator can receive the indication from a synthetic transaction generator. The indication can include a start beacon packet or other indication. Initiating the packet capture can refer to or include a functionality such as a tcpdump command. The synthetic transaction generator can perform the packet capture on a virtual interface of the container.

In addition to initiating a packet capture, the synthetic transaction generator can clear a log file, such as a SSKEY-LOG file, stored at a predetermined location accessible to the one or more processors. The synthetic transaction generator can determine additional information or metadata associated with the synthetic transaction test, such as a residential location of the client device, public IP address, or name of the client device or virtual machine.

At ACT 204, the synthetic transaction generator can receive packets. The packets can include beacon frames and packets corresponding to the synthetic transaction test. The synthetic transaction generator can receive beacon packets and synthetic transaction packets. The packets can correspond to accessing or otherwise using a service (e.g., SaaS application) provided through a network by a service provider system. At ACT 206, the synthetic transaction generator can store the packets. The synthetic transaction generator can store the beacon packets and the synthetic transaction packets. The synthetic transaction generator can store the packets in a packet capture trace file.

At decision block 208, the synthetic transaction generator can determine whether the synthetic test is complete. The synthetic transaction generator can determine the test is complete based on the instructions or sequence of steps defined for a particular test. In some cases, in which beacon packets or beacon frames can be used to indicate the start or stop of a test, the synthetic transaction generator can determine whether a test is complete based on receipt of the stop beacon packet. If the test is still on-going, then the synthetic transaction generator can return to ACT 204 and 206 to store and record additional test packets received by the synthetic transaction generator as well as generated synthetic transaction packets.

The synthetic transaction generator can determine the synthetic transaction test is complete at block 208. For example, the synthetic transaction generator can receive a stop beacon packet or other indication that the test is complete. If the synthetic transaction generator determines the test is complete, the synthetic transaction generator can proceed to ACT 210 to terminate the packet capture.

At ACT 212, the synthetic transaction generator can transmit the packet capture trace file to a data processing system for further processing and analytics. The synthetic transaction generator can transmit metatdata or other information associated with the test to the data processing system, such as key information used to decrypt the packets, a log file, residential location, device name, an identifier of the synthetic transaction generator, or an ISP public IP address.

The data processing system can replay the packet capture trace file to perform deep packet inspection and generate metrics indicating the performance of the service as accessed through the network.

Figure 2B:
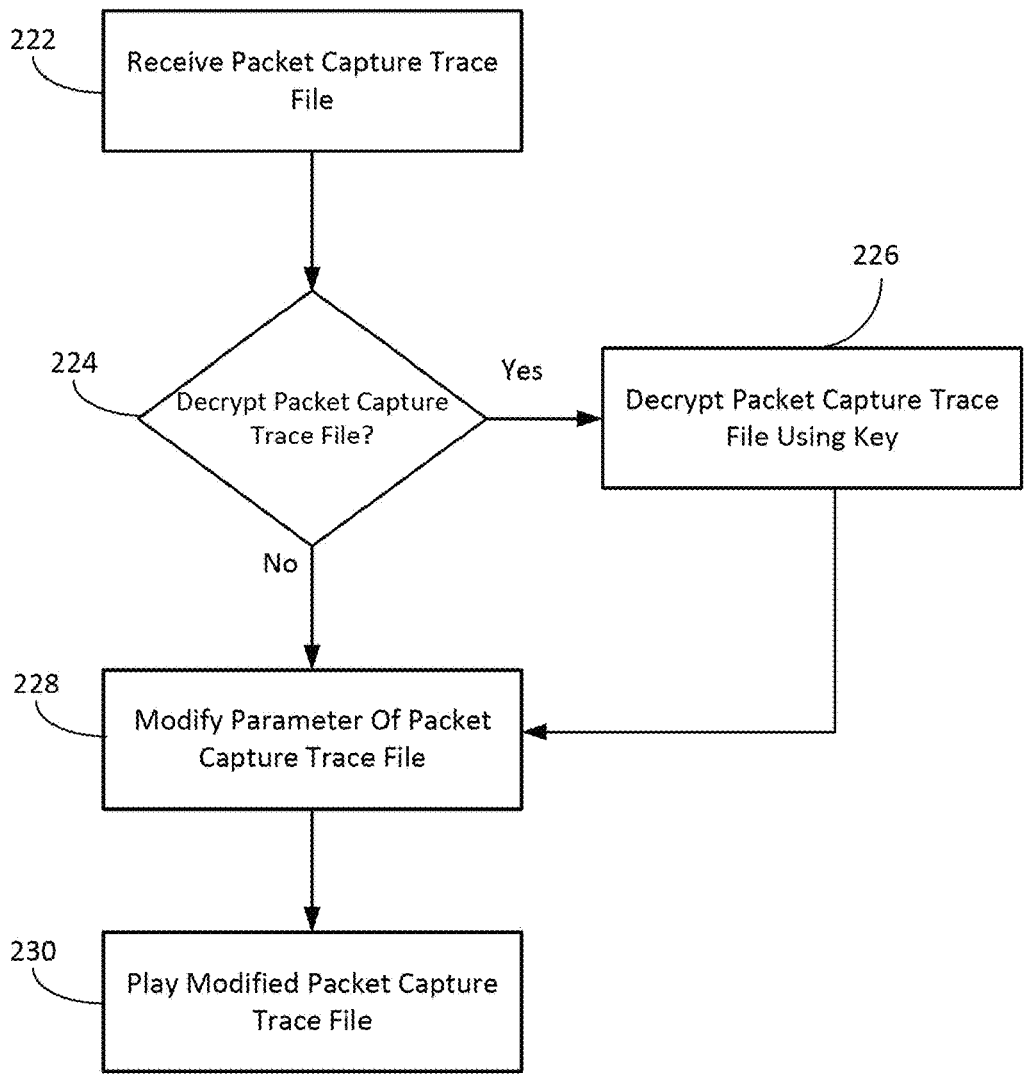
FIG. 2B is an illustration of a method of generating synthetic transactions, in accordance with an implementation.

FIG. 2B is a method of generating synthetic transactions with packets, in accordance with an implementation. The method 201 can be performed by one or more system, component or module depicted in FIG. 1A, 1B, 3A, 3B, or 3C, including, for example, a client device, data processing system, or service of a cloud service provider system. At ACT 222, the data processing system can receive the packet capture trace file. The data processing system can receive the packet capture trace file from a synthetic transaction generator responsive to completion of a synthetic transaction test. The data processing system can receive additional information associated with the test, such as key information used to decrypt the packets, a log file, residential location information, public ISP IP address, or a device identifier.

At decision block 224, the data processing system can determine whether to decrypt the packet capture trace file. The data processing system can determine whether to decrypt the file based on whether or not the packet trace file is encrypted with a network security protocol. In implementations, the packets in the packet capture trace file can be decrypted by a synthetic transaction generator hosted in a container on a client device or virtual machine, in which case the data processing system may not have to decrypt the packets. The data processing system can determine whether or not to decrypt the file based on an indication in the meta data or an indication from an administrator of the data processing system or by parsing the packets to determine whether they are encrypted. If the data processing system determines to decrypt the packet capture trace file, the data processing system can proceed to ACT 226 to decrypt the packet capture trace file using key information received from the synthetic transaction generator. The data processing system can generate a second packet capture trace file that is decrypted, but otherwise the same or similar to the packet capture trace file received from the synthetic transaction generator.

After decrypting the packet capture trace file, or if the data processing system determines not decrypt the file because the packets are already decrypted, the data processing system can proceed to ACT 228 to modify a parameter of the packet capture trace file. The data processing system can determine to modify an IP address of the packets in the packet capture trace file in order to concurrently replay multiple packet capture trace files. For example, there may be multiple synthetic transaction generators located at multiple residential locations that are associated with the same source IP address due to a Home LAN IP address being the same across the residential locations. The data processing system may not be able to analyze the packets or generate metrics or performance information if the packets have the same source IP address. Thus, the data processing system can modify the source IP address of packets in a packet capture trace file to map to a unique IP address, such as the ISP public IP address.

At ACT 230, the data processing system can play the modified packet capture trace file to evaluate a performance of a SaaS app or service accessed by the client device. The data processing system can play the packets in real-time by maintaining the relative time intervals between packets to match the time intervals detected by the synthetic transaction generator executing on the client device that generated the synthetic transaction test.

The packet capture trace file can include time stamps for each packet that is part of the test. The time stamps can indicate when the packets were recorded in the packet capture trace file. The data processing system can play back the packets in a manner that preservers the relative time difference between the packets based on the time stamps associated with the packets. In implementations, the data processing system can perform analytics based on the times stamps of the packets without having to play back the packets. For example, the time stamps associated with the packets and the information stored in the header or payload of the packets can indicate a performance of the service being tested. Thus, in some cases, the data processing system can generate performance metrics for the test of the service based on the time stamps of the packets stored in the packet capture trace file.

Figure 3A:
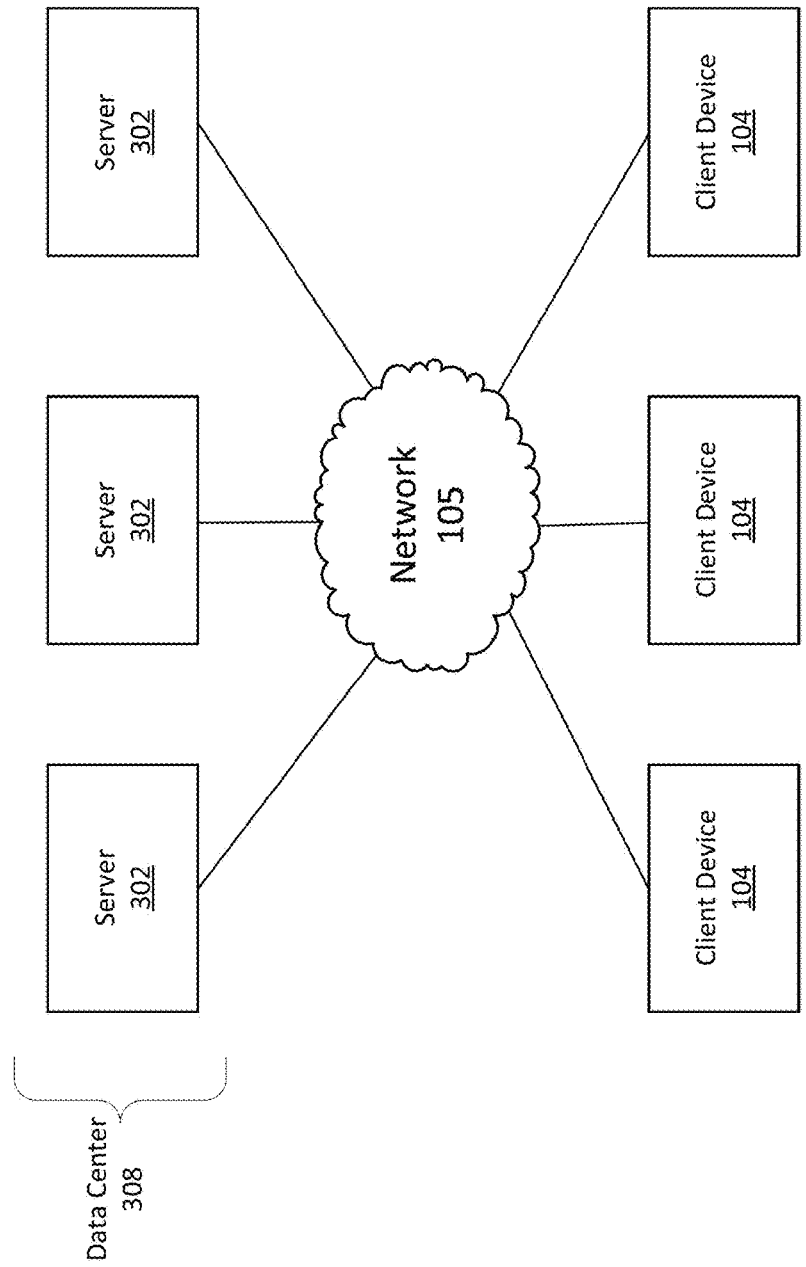
FIG. 3A is a block diagram depicting an implementation of a network environment including a client device in communication with a server device.
Figure 3B:
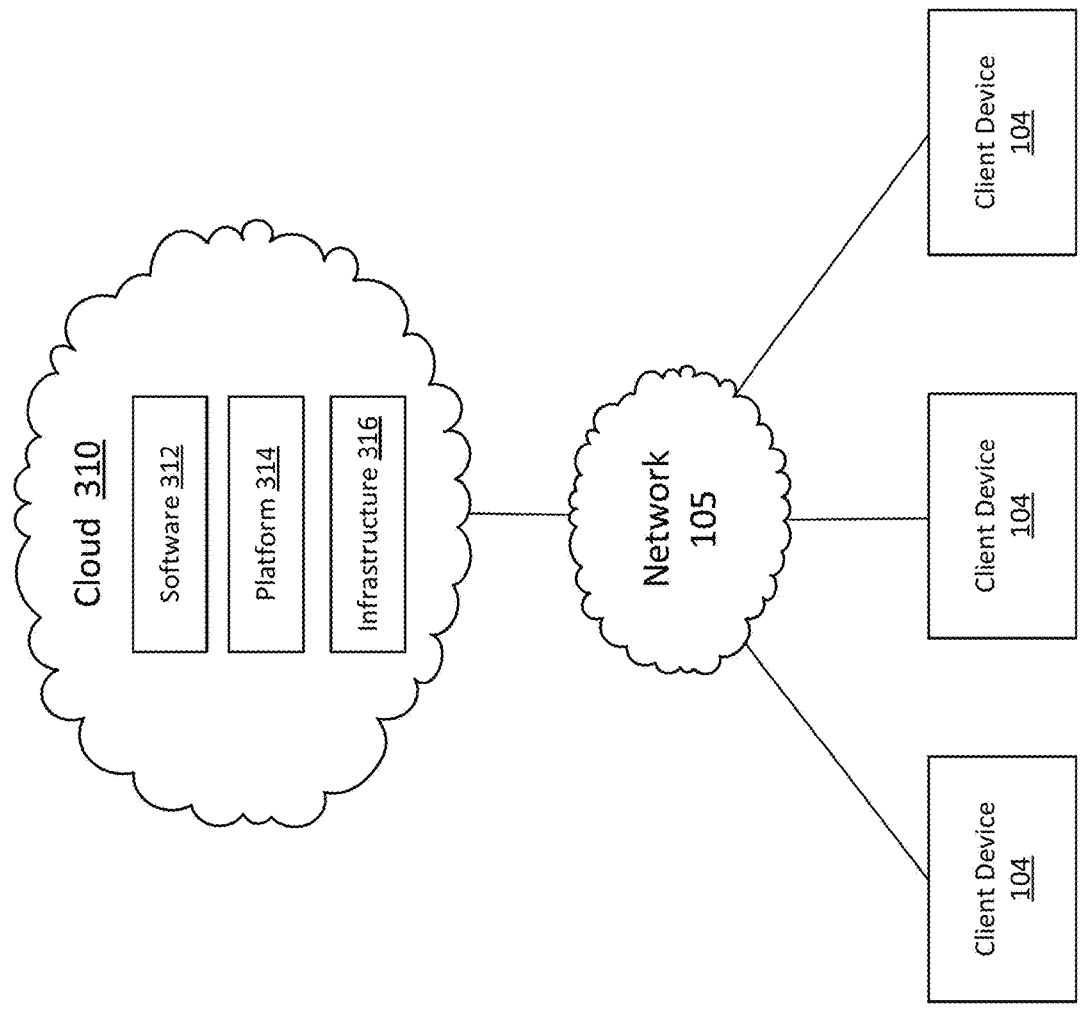
FIG. 3B is a block diagram depicting a cloud computing environment including a client device in communication with cloud service providers.

FIG. 3A depicts an example network environment that can be used in connection with the methods and systems described herein. In brief overview, the network environment 300 includes one or more clients devices 104 (also generally referred to as clients, client node, client machines, client computers, client computing devices, endpoints, or endpoint nodes) in communication with one or more servers 302 (also generally referred to as servers, nodes, or remote machine) via one or more networks 304. In some embodiments, a client device 104 has the capacity to function as both a client node seeking access to resources provided by a server and as a server providing access to hosted resources for other clients 104.

Although FIG. 3A shows a network 105 between the clients 104 and the servers 302, the clients 104 and the servers 302 can be on the same network 105. In embodiments, there are multiple networks 304 between the clients 104 and the servers 302. The network 105 can include multiple networks such as a private network and a public network. The network 105 can include multiple private networks.

The network 105 can include one or more component or functionality of network 105 depicted in FIG. 3A. The network 105 can be connected via wired or wireless links. Wired links can include Digital Subscriber Line (DSL), coaxial cable lines, or optical fiber lines. The wireless links can include BLUETOOTH, Wi-Fi, Worldwide Interoperability for Microwave Access (WiMAX), an infrared channel or satellite band. The wireless links can also include any cellular network standards used to communicate among mobile devices, including standards that qualify as 1G, 2G, 3G, 4G, 5G or other standards. The network standards can qualify as one or more generation of mobile telecommunication standards by fulfilling a specification or standards such as the specifications maintained by International Telecommunication Union. Examples of cellular network standards include AMPS, GSM, GPRS, UMTS, LTE, LTE Advanced, Mobile WiMAX, and WiMAX-Advanced. Cellular network standards can use various channel access methods e.g. FDMA, TDMA, CDMA, or SDMA. In some embodiments, different types of data can be transmitted via different links and standards. In other embodiments, the same types of data can be transmitted via different links and standards.

The network 105 can be any type and/or form of network. The geographical scope of the network 105 can vary widely and the network 105 can be a body area network (BAN), a personal area network (PAN), a local-area network (LAN), e.g. Intranet, a metropolitan area network (MAN), a wide area network (WAN), or the Internet. The topology of the network 105 can be of any form and can include, e.g., any of the following: point-to-point, bus, star, ring, mesh, or tree. The network 105 can be an overlay network which is virtual and sits on top of one or more layers of other networks 304. The network 105 can be of any such network topology as known to those ordinarily skilled in the art capable of supporting the operations described herein. The network 105 can utilize different techniques and layers or stacks of protocols, including, e.g., the Ethernet protocol or the internet protocol suite (TCP/IP). The TCP/IP internet protocol suite can include application layer, transport layer, internet layer (including, e.g., IPv6), or the link layer. The network 105 can be a type of a broadcast network, a telecommunications network, a data communication network, or a computer network.

The network environment 300 can include multiple, logically grouped servers 302. The logical group of servers can be referred to as a data center 308 (or server farm or machine farm). In embodiments, the servers 302 can be geographically dispersed. The data center 308 can be administered as a single entity or different entities. The data center 308 can include multiple data centers 38 that can be geographically dispersed. The servers 302 within each data center 308 can be homogeneous or heterogeneous (e.g., one or more of the servers 302 or machines 302 can operate according to one type of operating system platform (e.g., WINDOWS NT, manufactured by Microsoft Corp. of Redmond, Wash.), while one or more of the other servers 302 can operate on according to another type of operating system platform (e.g., Unix, Linux, or Mac OS X)). The servers 302 of each data center 308 do not need to be physically proximate to another server 302 in the same machine farm 38. Thus, the group of servers 302 logically grouped as a data center 308 can be interconnected using a network. Management of the data center 308 can be de-centralized. For example, one or more servers 302 can comprise components, subsystems and modules to support one or more management services for the data center 308.

Server 302 can be a file server, application server, web server, proxy server, appliance, network appliance, gateway, gateway server, virtualization server, deployment server, SSL VPN server, or firewall. In embodiments, the server 302 can be referred to as a remote machine or a node. Multiple nodes can be in the path between any two communicating servers.

FIG. 3B illustrates an example cloud computing environment. A cloud computing environment 301 can provide client device 104 with one or more resources provided by a network environment. The cloud computing environment 301 can include one or more clients 104, in communication with the cloud 310 over one or more networks 304. Clients 104 can include, e.g., thick clients, thin clients, and zero clients. A thick client can provide at least some functionality even when disconnected from the cloud 310 or servers 302. A thin client or a zero client can depend on the connection to the cloud 310 or server 302 to provide functionality. A zero client can depend on the cloud 310 or other networks 304 or servers 302 to retrieve operating system data for the client device. The cloud 310 can include back end platforms, e.g., servers 302, storage, server farms or data centers.

The cloud 310 can be public, private, or hybrid. Public clouds can include public servers 302 that are maintained by third parties to the clients 104 or the owners of the clients. The servers 302 can be located off-site in remote geographical locations as disclosed above or otherwise. Public clouds can be connected to the servers 302 over a public network. Private clouds can include private servers 302 that are physically maintained by clients 104 or owners of clients. Private clouds can be connected to the servers 302 over a private network 105. Hybrid clouds 308 can include both the private and public networks 304 and servers 302.

The cloud 310 can also include a cloud-based delivery, e.g. Software as a Service (SaaS) 312, Platform as a Service (PaaS) 314, and Infrastructure as a Service (IaaS) 316. IaaS can refer to a user renting the use of infrastructure resources that are needed during a specified time period. IaaS providers can offer storage, networking, servers or virtualization resources from large pools, allowing the users to quickly scale up by accessing more resources as needed. PaaS providers can offer functionality provided by IaaS, including, e.g., storage, networking, servers or virtualization, as well as additional resources such as, e.g., the operating system, middleware, or runtime resources. SaaS providers can offer the resources that PaaS provides, including storage, networking, servers, virtualization, operating system, middleware, or runtime resources. In some embodiments, SaaS providers can offer additional resources including, e.g., data and application resources.

Clients 104 can access IaaS resources, SaaS resources, or PaaS resources. In embodiments, access to IaaS, PaaS, or SaaS resources can be authenticated. For example, a server or authentication server can authenticate a user via security certificates, HTTPS, or API keys. API keys can include various encryption standards such as, e.g., Advanced Encryption Standard (AES). Data resources can be sent over Transport Layer Security (TLS) or Secure Sockets Layer (SSL).

The client device 104 and server 302 can be deployed as and/or executed on any type and form of computing device, e.g. a computer, network device or appliance capable of communicating on any type and form of network and performing the operations described herein.

Figure 3C:
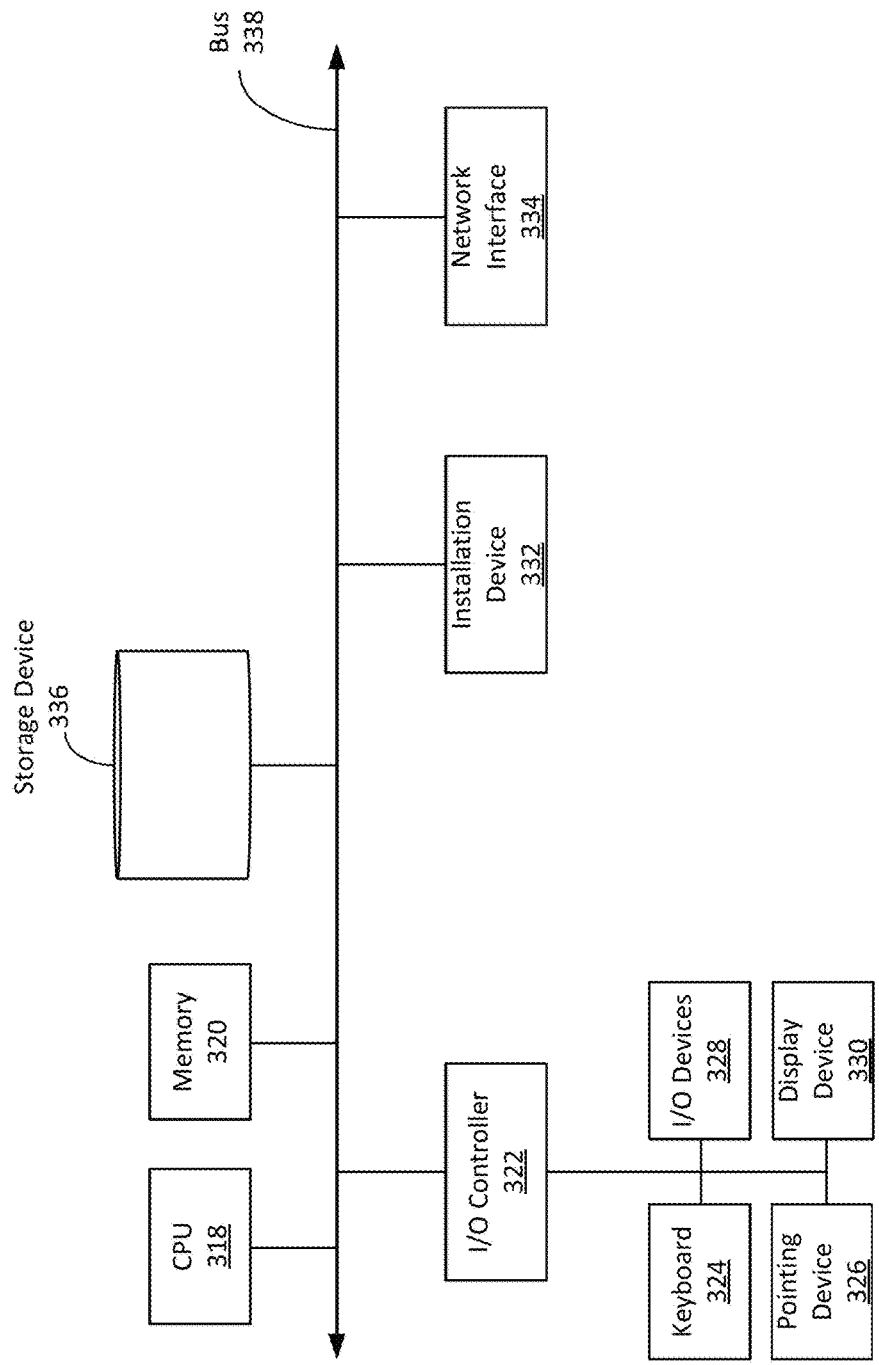
FIG. 3C is a block diagram depicting an implementation of a computing device that can be used in connection with the systems depicted in FIGS. 1, 3A and 3B, and the methods depicted in FIGS. 2A and 2B.

FIG. 3C depicts block diagrams of a computing device 303 useful for practicing an embodiment of the client device 104 or a server 302. As shown in FIG. 3C, each computing device 303 can include a central processing unit 318, and a main memory unit 320. As shown in FIG. 3C, a computing device 300 can include one or more of a storage device 336, an installation device 332, a network interface 334, an I/O controller 322, a display device 330, a keyboard 324 or a pointing device 326, e.g. a mouse. The storage device 336 can include, without limitation, a program, such as an operating system, software, or software associated with system 100.

The central processing unit 318 is any logic circuitry that responds to and processes instructions fetched from the main memory unit 320. The central processing unit 318 can be provided by a microprocessor unit, e.g.: those manufactured by Intel Corporation of Mountain View, Calif. The computing device 303 can be based on any of these processors, or any other processor capable of operating as described herein. The central processing unit 318 can utilize instruction level parallelism, thread level parallelism, different levels of cache, and multi-core processors. A multi-core processor can include two or more processing units on a single computing component.

Main memory unit 320 can include one or more memory chips capable of storing data and allowing any storage location to be directly accessed by the microprocessor 318. Main memory unit 322 can be volatile and faster than storage 336 memory. Main memory units 322 can be Dynamic random access memory (DRAM) or any variants, including static random access memory (SRAM). The memory 320 or the storage 336 can be non-volatile; e.g., non-volatile read access memory (NVRAM). The memory 320 can be based on any type of memory chip, or any other available memory chips. In the example depicted in FIG. 3C, the processor 318 can communicate with memory 320 via a system bus 338.

A wide variety of I/O devices 328 can be present in the computing device 303. Input devices 328 can include keyboards, mice, trackpads, trackballs, touchpads, touch mice, multi-touch touchpads and touch mice, microphones, multi-array microphones, drawing tablets, cameras, or other sensors. Output devices can include video displays, graphical displays, speakers, headphones, or printers.

The I/O devices can be controlled by an I/O controller 322 as shown in FIG. 3C. The I/O controller 322 can control one or more I/O devices, such as, e.g., a keyboard 324 and a pointing device 326, e.g., a mouse or optical pen. Furthermore, an I/O device can also provide storage and/or an installation device 332 for the computing device 303. In embodiments, the computing device 303 can provide USB connections (not shown) to receive handheld USB storage devices. In embodiments, an I/O device 328 can be a bridge between the system bus 338 and an external communication bus, e.g. a USB bus, a SCSI bus, a FireWire bus, an Ethernet bus, a Gigabit Ethernet bus, a Fibre Channel bus, or a Thunderbolt bus.

In embodiments, display devices 330 can be connected to I/O controller 322. Display devices can include, e.g., liquid crystal displays (LCD), electronic papers (e-ink) displays, flexile displays, light emitting diode displays (LED), or other types of displays. In some embodiments, display devices 330 or the corresponding I/O controllers 322 can be controlled through or have hardware support for OPENGL or DIRECTX API or other graphics libraries. Any of the I/O devices 328 and/or the I/O controller 322 can include any type and/or form of suitable hardware, software, or combination of hardware and software to support, enable or provide for the connection and use of one or more display devices 330 by the computing device 303. For example, the computing device 303 can include any type and/or form of video adapter, video card, driver, and/or library to interface, communicate, connect or otherwise use the display devices 330. In embodiments, a video adapter can include multiple connectors to interface to multiple display devices 330.

The computing device 303 can include a storage device 336 (e.g., one or more hard disk drives or redundant arrays of independent disks) for storing an operating system or other related software, and for storing application software programs such as any program related to the systems, methods, components, modules, elements, or functions depicted in FIG. 1A, 1B, 2A, or 2B. Examples of storage device 336 include, e.g., hard disk drive (HDD); optical drive including CD drive, DVD drive, or BLU-RAY drive; solid-state drive (SSD); USB flash drive; or any other device suitable for storing data. Storage devices 336 can include multiple volatile and non-volatile memories, including, e.g., solid state hybrid drives that combine hard disks with solid state cache. Storage devices 336 can be non-volatile, mutable, or read-only. Storage devices 336 can be internal and connect to the computing device 303 via a bus 338. Storage device 336 can be external and connect to the computing device 303 via a I/O device 330 that provides an external bus. Storage device 336 can connect to the computing device 303 via the network interface 334 over a network 105. Some client devices 104 may not require a non-volatile storage device 336 and can be thin clients or zero clients 104. Some storage devices 336 can be used as an installation device 316 and can be suitable for installing software and programs.

The computing device 303 can include a network interface 334 to interface to the network 105 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). The computing device 303 can communicate with other computing devices 303 via any type and/or form of gateway or tunneling protocol e.g. Secure Socket Layer (SSL) or Transport Layer Security (TLS), or QUIC protocol. The network interface 334 can include a built-in network adapter, network interface card, PCMCIA network card, EXPRESSCARD network card, card bus network adapter, wireless network adapter, USB network adapter, modem or any other device suitable for interfacing the computing device 303 to any type of network capable of communication and performing the operations described herein.

A computing device 303 of the sort depicted in FIG. 3C can operate under the control of an operating system, which controls scheduling of tasks and access to system resources. The computing device 303 can be running any operating system configured for any type of computing device, including, for example, a desktop operating system, a mobile device operating system, a tablet operating system, or a smartphone operating system.

The computer system 303 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 300 has sufficient processor power and memory capacity to perform the operations described herein. In some embodiments, the computing device 300 can have different processors, operating systems, and input devices consistent with the device.

In embodiments, the status of one or more machines 104, 302 in the network 105 can be monitored as part of network management. In embodiments, the status of a machine can include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information can be identified by a plurality of metrics, and the plurality of metrics can be applied at least in part towards decisions in load distribution, network traffic management, and network failure recovery as well as any aspects of operations of the present solution described herein.

The processes, systems and methods described herein can be implemented by the computing device 303 in response to the CPU 318 executing an arrangement of instructions contained in main memory 320. Such instructions can be read into main memory 320 from another computer-readable medium, such as the storage device 336. Execution of the arrangement of instructions contained in main memory 320 causes the computing system 303 to perform the illustrative processes described herein. One or more processors in a multi-processing arrangement may also be employed to execute the instructions contained in main memory 320. Hard-wired circuitry can be used in place of or in combination with software instructions together with the systems and methods described herein. Systems and methods described herein are not limited to any specific combination of hardware circuitry and software.

Although an example computing system has been described in FIG. 3, the subject matter including the operations described in this specification can be implemented in other types of digital electronic circuitry, or in computer software, firmware, or hardware, including the structures disclosed in this specification and their structural equivalents, or in combinations of one or more of them.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computing device" or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the synthetic transaction generator 134 or synthetic transaction generator 134) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all implementations, and the described program components can be included in a single hardware or software product.

The phraseology and terminology used herein is for the purpose of description and should not be regarded as limiting. Any references to implementations or elements or acts of the systems and methods herein referred to in the singular may also embrace implementations including a plurality of these elements, and any references in plural to any implementation or element or act herein may also embrace implementations including only a single element. Any implementation disclosed herein may be combined with any other implementation or embodiment.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method to monitor performance of services, the method comprising:
   initiating, by a synthetic transaction generator executed by one or more processors of a first device, a packet capture application for a test of a service provided over a network, the test of the service to occur while one or more second devices communicate with the service;
   transmitting, by the synthetic transaction generator, responsive to initiating the packet capture application, one or more data packets that represent synthetic transactions, wherein the one or more data packets are encrypted by the synthetic transaction generator using key material such that the one or more data packets include first metadata to (1) identify the synthetic transaction generator and (2) indicate the test of the service;
   identifying, by the synthetic transaction generator, the one or more data packets from a plurality of data packets transmitted across the network, the one or more data packets identified responsive to detecting the first metadata;

storing, by the synthetic transaction generator, responsive to identifying the one or more data packets, the one or more data packets in a packet capture trace file, the packet capture trace file including (i) time stamps corresponding to receipt of the one or more data packets, (ii) an identifier of the synthetic transaction generator, and (iii) second metadata to indicate the key material used to encrypt the one or more data packets;

terminating, by the synthetic transaction generator, the packet capture application responsive to completion of the test of the service; and transmitting, by the synthetic transaction generator responsive to terminating the packet capture application, the packet capture trace file to a data processing system to cause the data processing system to use the packet capture trace file to determine a performance of the service.

2. The method of claim 1, comprising:
filtering, by the synthetic transaction generator, one or more second data packets of the plurality of data packets to prevent storage of the one or more second data packets in the packet capture trace file that do not correspond to the test of the service.

3. The method of claim 1, comprising:
launching, by the first device comprising the one or more processors, a virtual machine;
and executing, by the virtual machine, the synthetic transaction generator.

4. The method of claim 1, comprising:
establishing, by the first device comprising the one or more processors, a container on an operating system of the first device, the operating system configured to run a plurality of client applications outside the container, wherein the container comprises code to execute the synthetic transaction generator in a standalone format; and
executing, by the first device, the synthetic transaction generator in the container.

5. The method of claim 1, comprising:
storing, by the synthetic transaction generator, each of the one or more data packets with information about an Internet Service Provider associated with the one or more processors, a location of the one or more processors, and the identifier of the synthetic transaction generator.

6. The method of claim 1, comprising:
prior to initiation of the test of the service, clearing, by the synthetic transaction generator, a log file of a proxy application used to conduct the test; and
updating, by the synthetic transaction generator, the log file with key information.

7. The method of claim 6, comprising:
transmitting, by the synthetic transaction generator to the data processing system responsive to completion of the test of the service, the packet capture trace file with the log file, and the identifier of the synthetic transaction generator.

8. The method of claim 7, comprising:
decrypting, by the data processing system, the packet capture trace file using the key information stored in the log file to generate a second packet capture file comprising decrypted packets; and
playing, by the data processing system, the decrypted packets of the second packet capture file.

9. The method of claim 1, comprising:
modifying, by the data processing system, an internet protocol ("IP") address of each of the one or more data packets stored in the packet capture trace file based on an IP address of an Internet Service Provider of the first device; and
playing, by the data processing system, the one or more data packets of the packet capture trace file having the modified IP address.

10. The method of claim 1, comprising:
playing, by the data processing system, the packet capture trace file in real-time by maintaining time intervals between data packets of the one or more data packets of the packet capture trace file.

11. The method of claim 1, wherein the service is hosted by a service provider system that is different and remote from the data processing system and the one or more processors.

12. A system to replay synthetic transactions to manage performance of services, comprising:
one or more processors and memory; and
a synthetic transaction generator executed by the one or more processors to:
initiate a packet capture application for a test of a service provided over a network, the test of the service to occur while one or more devices communicate with the service;
transmit, responsive to initiation of the packet capture application, one or more data packets that represent the synthetic transactions, wherein the one or more data packets are encrypted by the synthetic transaction generator using key material such that the one or more data packets include first metadata to (1) identify the synthetic transaction generator and (2) indicate the test of the service;
identify the one or more data packets from a plurality of data packets transmitted across the network, the one or more data packets identified responsive to detection of the first metadata;
store, responsive to identification of the one or more data packets, the one or more data packets in a packet capture trace file, the packet capture trace file including (i) time stamps corresponding to receipt of the one or more data packets, (ii) an identifier of the synthetic transaction generator, and (iii) second metadata to indicate the key material used to encrypt the one or more data packets;
terminate the packet capture application responsive to completion of the test of the service; and
transmit, responsive to termination of the packet capture application, the packet capture trace file to a data processing system to cause the data processing system to use the packet capture trace file to determine a performance of the service.

13. The system of claim 12, wherein the synthetic transaction generator is further configured to:
filter one or more second data packets of the plurality of data packets to prevent storage of the one or more data packets in the packet capture trace file that do not correspond to the test of the service provided through the network.

14. The system of claim 12, wherein the synthetic transaction generator is further configured to:
store each of the one or more data packets with information about an Internet Service Provider associated with the one or more processors, a location of the one or more processors, and the identifier of the synthetic transaction generator.

15. The system of claim 12, wherein the synthetic transaction generator is further configured to:
   clear, prior to initiation of the test of the service, a log file of a test application; and
   update the log file with key information.

16. The system of claim 15, wherein the synthetic transaction generator is further configured to:
   transmit, to the data processing system responsive to completion of the test of the service, the packet capture trace file with the log file, and the identifier of the synthetic transaction generator.

* * * * *